(12) United States Patent
Shimura

(10) Patent No.: US 12,424,880 B2
(45) Date of Patent: Sep. 23, 2025

(54) POWER TRANSMITTING APPARATUS, CONTROL METHOD FOR POWER TRANSMITTING APPARATUS, AND STORAGE MEDIUM

(71) Applicant: CANON KABUSHIKI KAISHA, Tokyo (JP)

(72) Inventor: Hajime Shimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 18/064,003

(22) Filed: Dec. 9, 2022

(65) Prior Publication Data

US 2023/0122918 A1    Apr. 20, 2023

Related U.S. Application Data

(63) Continuation of application No. PCT/JP2021/014896, filed on Apr. 8, 2021.

(30) Foreign Application Priority Data

Jun. 26, 2020    (JP) .................................. 2020-110818

(51) Int. Cl.
    *H02J 50/60*    (2016.01)
    *H02J 50/40*    (2016.01)
    *H02J 50/80*    (2016.01)

(52) U.S. Cl.
    CPC .............. *H02J 50/60* (2016.02); *H02J 50/40* (2016.02); *H02J 50/80* (2016.02)

(58) Field of Classification Search
    CPC .. H02J 50/60; H02J 50/40; H02J 50/80; H02J 50/402; H02J 50/12
    See application file for complete search history.

(56) References Cited

U.S. PATENT DOCUMENTS

| | | | |
|---|---|---|---|
| 8,180,286 B2* | 5/2012 | Yamasuge | H02J 50/80 |
| | | | 320/108 |
| 9,423,439 B2* | 8/2016 | Jung | H02J 50/60 |
| 10,014,708 B2* | 7/2018 | Inoue | H02J 50/80 |
| 10,361,595 B1* | 7/2019 | Zeine | H02J 50/20 |
| 2011/0244794 A1* | 10/2011 | Nakano | H02J 7/00034 |
| | | | 455/41.1 |

(Continued)

FOREIGN PATENT DOCUMENTS

| | | | |
|---|---|---|---|
| JP | 2015-056959 A | | 3/2015 |
| JP | 2015-211536 A | | 11/2015 |

(Continued)

*Primary Examiner* — Daniel Kessie
*Assistant Examiner* — Brian K Baxter
(74) *Attorney, Agent, or Firm* — Canon U.S.A., Inc. IP Division

(57) ABSTRACT

A power transmitting apparatus (100) that transmits power wirelessly using a time-division method to a plurality of power receiving apparatuses (200) derives a plurality of pieces of data of power loss between the power transmitting apparatus (100) and the plurality of power receiving apparatuses (200) on a basis of a plurality of reception power values received from the plurality of power receiving apparatuses (200); and detects a foreign object within a power-transmittal range of the power transmitting apparatus (100) on a basis of the plurality of pieces of data of power loss.

6 Claims, 12 Drawing Sheets

(56) References Cited

U.S. PATENT DOCUMENTS

| | | | |
|---|---|---|---|
| 2012/0293011 A1* | 11/2012 | Byun | H02J 50/80 307/104 |
| 2013/0082652 A1* | 4/2013 | Jung | H02J 50/80 320/108 |
| 2013/0221912 A1* | 8/2013 | Kang | H02J 50/40 320/108 |
| 2014/0223204 A1* | 8/2014 | Haraguchi | G06F 1/26 320/108 |
| 2014/0300200 A1* | 10/2014 | Ito | H02J 50/80 307/104 |
| 2014/0333131 A1* | 11/2014 | Maruhashi | H02J 50/80 307/11 |
| 2015/0116296 A1 | 4/2015 | Greene | |
| 2015/0133056 A1* | 5/2015 | Kang | H04W 4/80 455/41.2 |
| 2016/0094050 A1* | 3/2016 | Shichino | H02J 50/12 307/104 |
| 2016/0164306 A1* | 6/2016 | Tachiwa | H02J 50/80 307/104 |
| 2016/0268815 A1 | 9/2016 | Lee | |
| 2016/0336804 A1* | 11/2016 | Son | H02J 50/40 |
| 2017/0033609 A1 | 2/2017 | Nakamura | |
| 2017/0093214 A1 | 3/2017 | Watanabe et al. | |
| 2017/0170686 A1* | 6/2017 | Van Wageningen | H02J 50/10 |
| 2017/0294797 A1* | 10/2017 | Meng | H02J 50/80 |
| 2018/0131243 A1* | 5/2018 | Hamaguchi | H02J 50/12 |
| 2018/0342905 A1* | 11/2018 | Fukaya | H02J 50/402 |
| 2019/0237992 A1* | 8/2019 | Miwa | H02J 50/20 |
| 2019/0356175 A1* | 11/2019 | Jo | H02J 50/90 |
| 2020/0169121 A1 | 5/2020 | Keith et al. | |
| 2020/0328616 A1* | 10/2020 | Van Wageningen | H02J 50/10 |
| 2020/0366137 A1* | 11/2020 | Park | H02J 50/40 |
| 2021/0036555 A1* | 2/2021 | Park | H04L 9/40 |
| 2021/0194296 A1* | 6/2021 | Jo | H02J 50/80 |
| 2021/0210984 A1 | 7/2021 | Peralta | |
| 2021/0266042 A1* | 8/2021 | Park | H02J 50/60 |
| 2022/0352762 A1 | 11/2022 | Kovacs | |
| 2023/0108768 A1* | 4/2023 | Park | H02J 50/60 307/104 |

FOREIGN PATENT DOCUMENTS

| | | |
|---|---|---|
| JP | 2017-070074 A | 4/2017 |
| JP | 2017-529823 A | 10/2017 |
| JP | 2018-520630 A | 7/2018 |
| JP | 2019-515629 A | 6/2019 |
| JP | 2020-061939 A | 4/2020 |
| WO | 2015/037362 A1 | 3/2015 |
| WO | 2016/044025 A1 | 3/2016 |
| WO | 2017/012979 A1 | 1/2017 |
| WO | 2017/194338 A1 | 11/2017 |

* cited by examiner

POWER TRANSMITTING APPARATUS, CONTROL METHOD FOR POWER TRANSMITTING APPARATUS, AND STORAGE MEDIUM

CROSS-REFERENCE TO RELATED APPLICATIONS

This application is a Continuation of International Patent Application No. PCT/JP2021/014896, filed Apr. 8, 2021, which claims the benefit of Japanese Patent Application No. 2020-110818, filed Jun. 26, 2020, both of which are hereby incorporated by reference herein in their entirety.

BACKGROUND

Field

The present disclosure relates to a wireless power transmission technique.

Background Art

Development of technology relating to wireless power transmission systems has been carried out extensively in recent years. A power transmitting apparatus and a power receiving apparatus compliant with a standard (the Wireless Power Consortium (WPC) standard) developed by the WPC, a group for promoting wireless charging standards, are described in PTL 1. Also, a method for foreign object detection relating to the WPC standard is described in PTL 2. Herein, a foreign object is an object with electrical conductivity such as a metal piece or the like. In the WPC standard, first, from the difference between the transmission power at a power transmitting apparatus and the reception power at a power receiving apparatus, the power loss in a state where there is no foreign object between the power transmitting apparatus and the power receiving apparatus is calculated in advance, and the calculated value is taken as the power loss in a normal state (state with no foreign object) during power transmission processing. Then, when the power loss between the power transmitting apparatus and the power receiving apparatus calculated during power transmission thereafter is separated from the power loss in a normal state, i.e., the reference, by a value equaling a threshold or greater, it is determined that there is a foreign object or that there is a possibility of a foreign object being there.

CITATION LIST

Patent Literature

PTL1: Japanese Patent Laid-Open No. 2015-56959
PTL2: Japanese Patent Laid-Open No. 2017-70074

However, with a power transmitting apparatus capable of charging a plurality of power receiving apparatuses, the power loss between the power transmitting apparatus and a first power receiving apparatus and the power loss between the power transmitting apparatus and a second power receiving apparatus is different. Thus, when the same power loss is used as the power loss in a normal state, i.e., the reference, the foreign object detection accuracy may be reduced. Also, when the first power receiving apparatus and the second power receiving apparatus are placed on the power transmitting apparatus, there is a possibility that the power loss between the power transmitting apparatus and the first power receiving apparatus may be effected by the second power receiving apparatus. In a similar manner, there is a possibility that the power loss between the power transmitting apparatus and the second power receiving apparatus may be effected by the first power receiving apparatus. Accordingly, when there is a change in the state (number of apparatuses or the like) of the power receiving apparatuses placed on the power transmitting apparatus, a change also occurs in the power loss between the power transmitting apparatus and the power receiving apparatus in a normal state calculated in advance. This also may reduce the foreign object detection accuracy.

SUMMARY

In light of the problems described above, the present disclosure provides a technique for appropriately transmitting power from a power transmitting apparatus to a plurality of power receiving apparatuses.

According to one aspect of the present disclosures, there is provided a power transmitting apparatus is comprising: power transmitting unit configured to transmit power wirelessly using a time-division method to a plurality of power receiving apparatuses; communicating unit configured to communicate with the plurality of power receiving apparatuses; deriving unit configured to derive a plurality of pieces of data of power loss between the power transmitting apparatus and the plurality of power receiving apparatuses on a basis of a plurality of reception power values received from the plurality of power receiving apparatuses via the communicating unit; and detecting unit configured to detect an object that is not one of the plurality of power receiving apparatuses performing communication within a power-transmittal range of the power transmitting apparatus on a basis of the plurality of pieces of data of power loss.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

DESCRIPTION OF THE EMBODIMENTS

Figure 1:
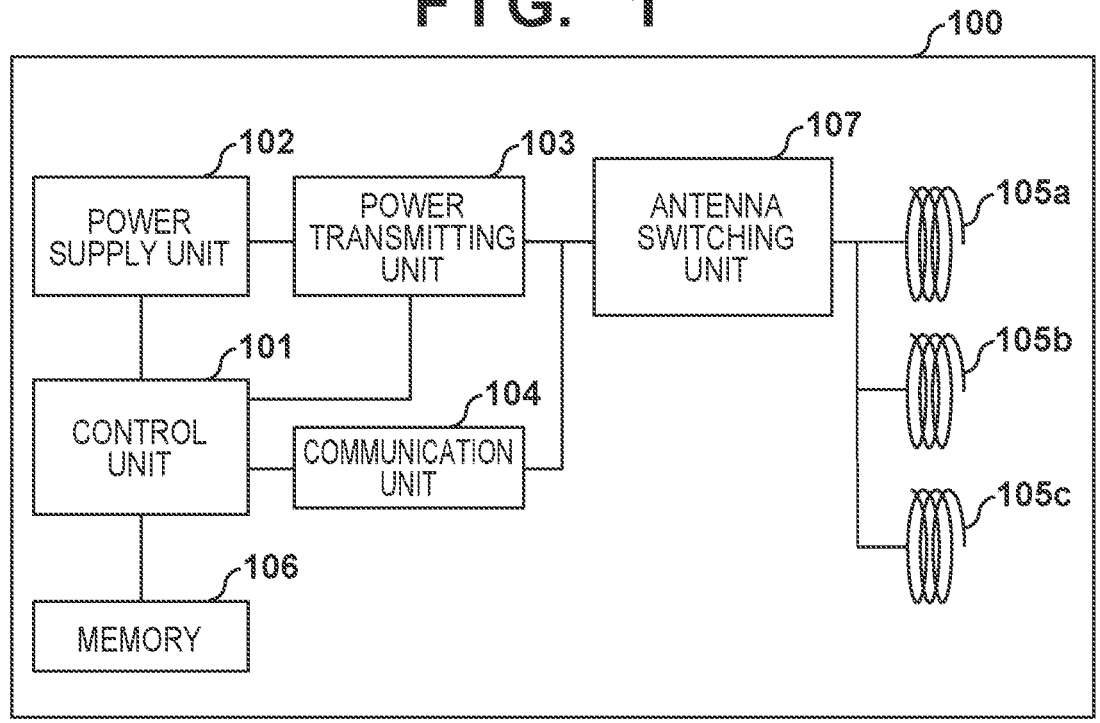
FIG. 1 is a block diagram illustrating an example configuration of a power transmitting apparatus.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

First Embodiment

Foreign Object Detection Method Based on Power Loss Method

Figure 10:
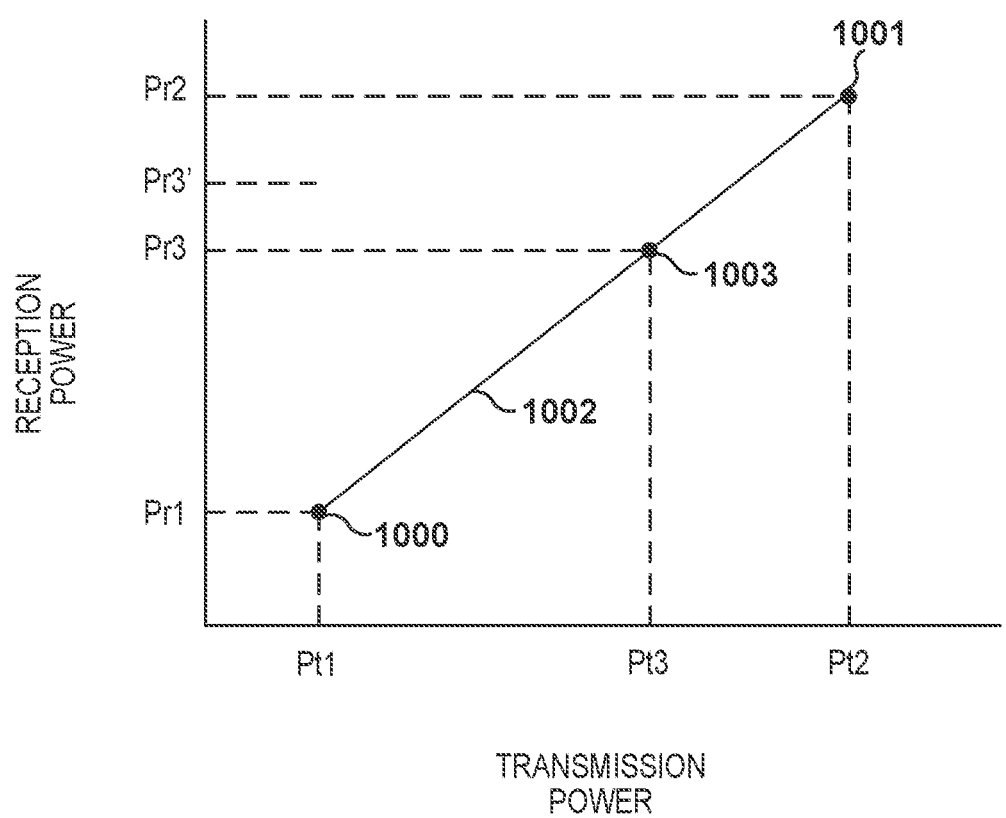
FIG. 10 is a diagram for describing a foreign object detection method based on the power loss method.

First, a foreign object detection method based on the power loss method specified in the Wireless Power Consortium (WPC) standard will be described using FIG. 10. FIG. 10 is a diagram for describing the foreign object detection method based on the power loss method. In FIG. 10, the transmission power of a power transmitting apparatus is represented on the horizontal axis, and the reception power of a power receiving apparatus is represented on the vertical axis. A foreign object is an object with electrical conductivity such as a metal piece or the like that is not the power receiving apparatus. In other words, when the target for power transmission is a plurality of power receiving apparatuses, other power receiving apparatuses are considered foreign objects. Power receiving apparatuses that are transmitting power and power receiving apparatus that are communicating for power transmission may be considered targets for power transmission.

First, the power transmitting apparatus transmits power to the power receiving apparatus and receives a reception power value Pr1 corresponding to the power received by the power receiving apparatus from the power receiving apparatus. Then, the power transmitting apparatus stores a transmission power value Pt1 of that time (point 1000). Herein, the transmission power value Pt1 is a predetermined minimum transmission power, and the reception power value Pr1 is a predetermined minimum reception power. At this time, the power receiving apparatus controls the load so that the power to be received is the minimum power. For example, the power receiving apparatus may disconnect the load from a power receiving antenna so that the power received is not supplied to the load (charging circuit, battery, or the like). Note that this state may be referred to a Light Load state. At this time, the power transmitting apparatus can recognize that the power loss between the power transmitting apparatus and the power receiving apparatus when Pt1 is transmitted as the transmission power corresponds to Pt1-Pr1 (Ploss1). Next, the power transmitting apparatus receives a value of a reception power value Pr2 corresponding to the power received by the power receiving apparatus. At this time, the power receiving apparatus supplies the power received to the load. Then, the power transmitting apparatus stores a transmission power value Pt2 of that time (point 1001). Herein, the transmission power value Pt2 is a predetermined maximum transmission power, and the reception power value Pr2 is a predetermined maximum reception power. At this time, the power receiving apparatus controls the load so that the power to be received is the maximum power. For example, the power receiving apparatus connects the power receiving antenna and the load so that the power received is supplied to the load. Note that this state may be referred to a Connected Load state. At this time, the power transmitting apparatus can recognize that the power loss between the power transmitting apparatus and the power receiving apparatus when Pt2 is transmitted as the transmission power corresponds to Pt2-Pr2 (Ploss2). Then, the power transmitting apparatus performs linear interpolation using the point 1000 and the point 1001 and generates a straight line 1002. The straight line 1002 indicates the relationship between the transmission power and the reception power in a state where there is no foreign object near the power transmitting apparatus and the power receiving apparatus. In other words, the straight line 1002 may be referred to as data corresponding to the reference for power loss. Accordingly, the reception power in a state where there is no foreign object can be estimated by the power transmitting apparatus from the transmission power value and the straight line 1002. For example, when the transmission power value is Pt3, from a point 1003 on the straight line 1002 indicating the transmission power value is Pt3, the reception power value can be estimated to be Pr3.

Herein, in a case where the power transmitting apparatus has transmitted power to the power receiving apparatus using a transmission power of Pt3, the power transmitting apparatus receives a value corresponding to a reception power value Pr3' from the power receiving apparatus. The power transmitting apparatus calculates a value Pr3-Pr3' (=Ploss_FO) obtained by subtracting the reception power value Pr3' corresponding to the actual power received from the power receiving apparatus from the reception power value Pr3 in a state where there is no foreign object. The Ploss_FO can be considered the power loss consumed by the foreign object when there is a foreign object between the power transmitting apparatus and the power receiving apparatus. Thus, when the power Ploss_FO considered to be consumed by the foreign object is equal to or greater than a predetermined threshold, it is determined that "there is a foreign object" or "there is a possibility that there is a foreign object".

Alternatively, the power transmitting apparatus obtains in advance a power loss Pt3-Pr3 (Ploss3) between the power transmitting apparatus and the power receiving apparatus from the reception power value Pr3 in a state where there is no foreign object. Next, a power loss Pt3-Pr3' (Ploss3') between the power transmitting apparatus and the power receiving apparatus in a state where there is a foreign object is obtained from the reception power value Pr3' corresponding to the power received from the power receiving apparatus in a state where there is a foreign object. Also, the power Ploss_FO considered to be consumed by the foreign object may be obtained from Ploss3'-Ploss3 (=Ploss_FO).

As described above, the method of obtaining the power Ploss_FO considered to be consumed by the foreign object may include obtaining Pr3-Pr3' (=Ploss_FO) or may include obtaining Ploss3'-Ploss3 (=Ploss_FO). Hereinafter, in the present specification, basically, the method of obtaining Ploss3'-Ploss3 (=Ploss_FO) is used, but the method of obtaining Pr3-Pr3' (=Ploss_FO) may also be applied. This concludes the description of foreign object detection based on the power loss method.

Overview of Foreign Object Detection Method According to Present Embodiment

Figure 2:
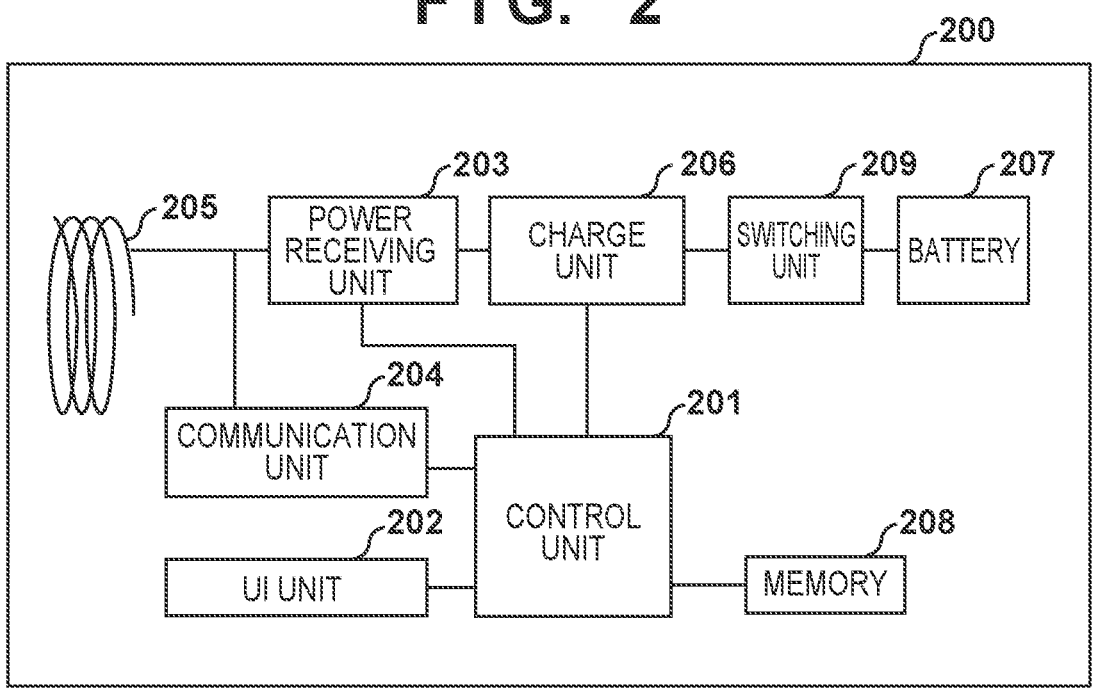
FIG. 2 is a block diagram illustrating an example configuration of a power receiving apparatus.

Next, a foreign object detection method of a power transmitting apparatus capable of transmitting power to a plurality of power receiving apparatus will be described. FIGS. 11A to 11F are diagrams illustrating examples of the configuration of a wireless power transmission system according to the present embodiment. Hereinafter, the power transmitting apparatus will be referred to as TX, and the power receiving apparatus will be referred to as RX. Note that the configurations of TX 100 and RXs 200 to 220 are illustrated in FIGS. 1 and 2 and are described below in detail.

The TX 100 transmits power to the RXs 200, 210, and 220 placed on the TX 100 (for example, on a charging stand (placement surface) disposed near power transmitting antennas 105a, 105b, and 105c) via the power transmitting antennas 105a, 105b, and 105c. The RXs 200, 210, and 220 each receive power transmitted from the TX 100 via a power receiving antenna 205. Note that communication between the TX and the RXs is performed via the power transmitting antenna and the power receiving antenna.

Figure 11A:
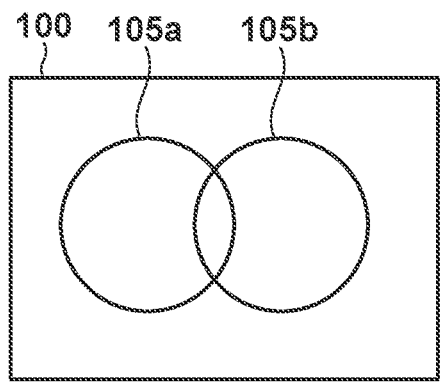
FIG. 11A is a diagram illustrating an example configuration of a wireless power transmission system.
Figure 11B:
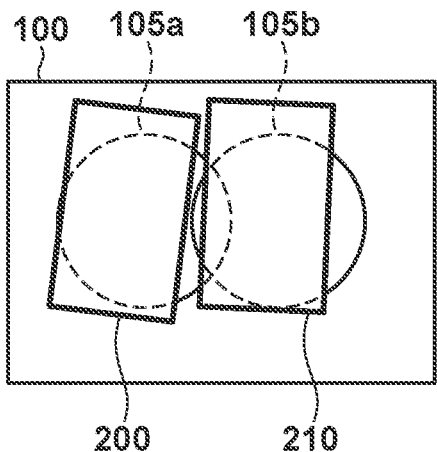
FIG. 11B is a diagram illustrating an example configuration of a wireless power transmission system.
Figure 11C:
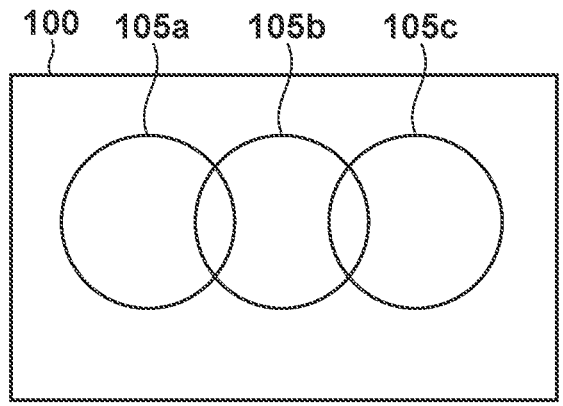
FIG. 11C is a diagram illustrating an example configuration of a wireless power transmission system.
Figure 11D:
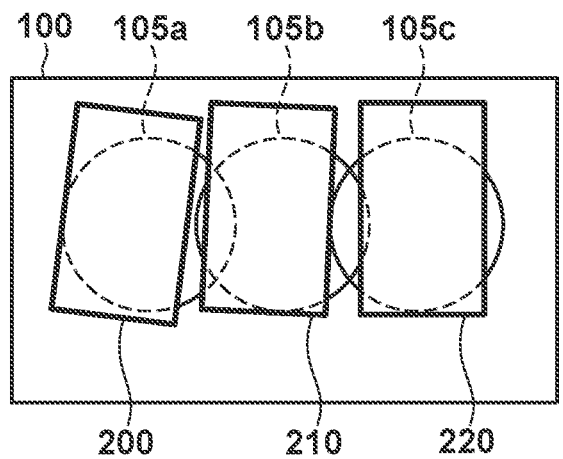
FIG. 11D is a diagram illustrating an example configuration of a wireless power transmission system.
Figure 11E:
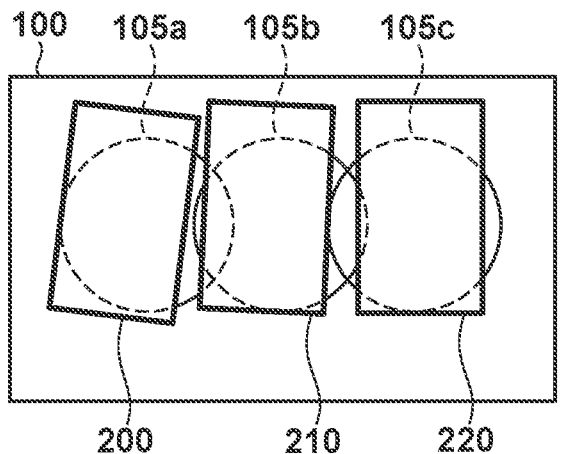
FIG. 11E is a diagram illustrating an example configuration of a wireless power transmission system.
Figure 11F:
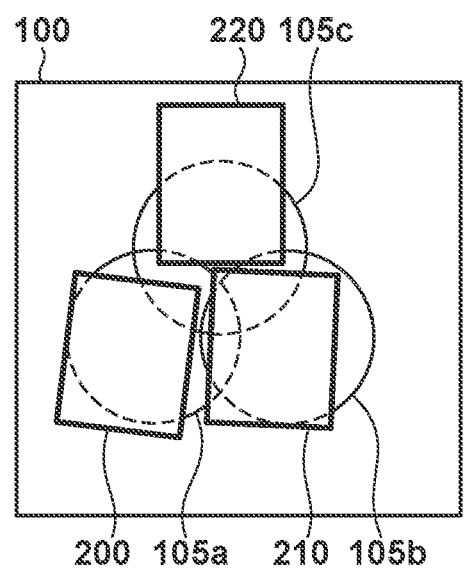
FIG. 11F is a diagram illustrating an example configuration of a wireless power transmission system.

The TX 100 illustrated in FIG. 11A includes power transmitting antennas 105a and 105b and transmits power to the RXs 200 and 210 as illustrated in FIG. 11B. Also, the TX 100 illustrated in FIG. 11C includes the power transmitting antennas 105a to 105c and transmits power to the RXs 200 to RX 220 as illustrated in FIGS. 11D to 11F.

Here, let's look at each TX-RX power loss between the TX and the plurality of RXs. With a TX being capable of transmitting power to (charging) a plurality of RXs (for example, a first RX and a second RX), the power loss between the TX and the first RX and the power loss between the TX and the second RX are different. For example, the TX 100 illustrated in FIG. 11C transmits power to the RX 200 via the power transmitting antenna 105a and the power receiving antenna 205 of the RX 200. Also, the TX 100 illustrated in FIG. 11C transmits power to the RX 210 via the power transmitting antenna 105b and the power receiving antenna 205 of the RX 210. At this time, the power loss between the TX 100 and the RX 200 and the power loss between the TX 100 and the RX 210 is different. There are various reasons for this including the characteristics of the power transmitting antenna, the characteristics of the power receiving antenna, the positional relationship between the TX (power transmitting antenna) and the RX, the effects of the RX 200 on the electrical characteristics of the power transmitting antenna 105b, the effects of the RX 210 on the electrical characteristics of the power transmitting antenna 105a, the state of the circuits inside the RX (for example, the connection state between the power receiving antenna and the load (charging circuit, battery, or the like)), and the like.

Because of this, when the same straight line indicating the power loss between the TX and the RX in a state where there is no foreign object between the TX and the RX or the relationship between the transmission power and the reception power as illustrated in FIG. 10 is used for between the TX and the first RX and between the TX and the second RX, the problem of a decrease in foreign object detection accuracy arises.

Also, when the first RX and the second RX are placed on the TX, there is a possibility that the power loss between the TX and the first RX may be effected by the second RX. In a similar manner, there is a possibility that the power loss between the TX and the second RX may be effected by the first RX. Thus, when there is a change in the state (number of devices, placement position, and the like) of the RXs placed on the TX, a change also occurs in straight line indicating the power loss between the TX and the RX in a state where there is no foreign object between the TX and the RX or the relationship between the transmission power and the reception power as illustrated in FIG. 10, giving rise to the problem of a decrease in foreign object detection accuracy.

To solve such a problem, the TX calculates, as a pre-calculated power loss between the TX and the RX in a state where there is no foreign object, each one of "the power loss between the TX and the first RX in a state where there is no foreign object" and "the power loss between the TX and the second RX in a state where there is no foreign object". Also, using "the power loss between the TX and the first RX in a state where there is no foreign object" when power is transmitted to the first RX as a reference, when the power loss between the TX and the first RX calculated during power transmission is separated from "the power loss between the TX and the first RX in a state where there is no foreign object" by a value equaling the threshold or greater, "there is a foreign object" or "there is a possibility that there is a foreign object" is determined. In a similar manner, using "the power loss between the TX and the second RX in a state where there is no foreign object" when power is transmitted to the second RX as a reference, when the power loss between the TX and the second RX calculated during power transmission processing is separated from "the power loss between the TX and the second RX in a state where there is no foreign object" by a value equaling the threshold or greater, "there is a foreign object" or "there is a possibility that there is a foreign object" is determined.

In this manner, the TX calculates in advance the power loss for each RX in a state where there is no foreign object, calculates the power loss for each RX during power transmission, compares the two, and determines whether or not there is a foreign object. Accordingly, foreign object detection can be appropriately performed with a wireless power transmission system in which a TX transmits power to a plurality of RXs.

Note that as described above using FIG. 10, the TX can calculate the value Pr3-Pr3' (=Ploss_FO) obtained by subtracting the reception power value Pr3' corresponding to the actual power received from the RX from the reception power value Pr3 in a state where there is no foreign object and can determine whether or not there is a foreign object on the basis of whether or not the value Pr3-Pr3' is equal to or greater than a predetermined threshold. In other words, the TX acquires "the reception power value from the first RX in a state where there is no foreign object" and "the reception power value from the second RX in a state where there is no foreign object" in advance in a state where there is no foreign object. Also, during power transmission to the first RX, when the difference between "the reception power value from the first RX in a state where there is no foreign object" and the reception power value from the RX acquired during power transmission is equal to or greater than a threshold, "there is a foreign object" or "there is a possibility that there is a foreign object" is determined. In a similar manner, during power transmission to the second RX, when the difference between "the reception power value from the second RX in a state where there is no foreign object" and the reception power value from the RX acquired during power transmission is equal to or greater than a threshold, "there is a foreign object" or "there is a possibility that there is a foreign object" is determined. By determining whether or not there is a foreign object in this manner, foreign object detection can be appropriately performed with a wireless power transmission system in which a TX transmits power to a plurality of RXs.

Also, the power transmission and reception state must be the same when the power loss between the TX and the RX in a state where there is no foreign object is calculated in advance (or when the reception power value is received from the RX) and when the power loss between the TX and the RX during power transmission is calculated (or when the reception power value from the RX is received). The power transmission and reception state includes, for example, the characteristics of the power transmitting antenna, the characteristics of the power receiving antenna, the positional relationship between the TX (power transmitting antenna) and the RX, the effects of the RX 200 on the electrical characteristics of the power transmitting antenna 105b, the effects of the RX 210 on the electrical characteristics of the power transmitting antenna 105a, the state of the circuits inside the RX (for example, the connection state between the power receiving antenna and the load (charging circuit, battery, or the like)), and the like.

To implement this, for example, first, when the power loss between the TX and the RX in a state where there is no foreign object is calculated in advance (or when the reception power value is received from the RX), the TX selects one of the RXs (a target RX) as the target from the plurality of RXs. The TX performs control so that the non-target RXs are put in a state of not being charged by or supplied with power transmitted from the TX. The state of not being charged by or supplied with power transmitted is a state in which the connection with the load (charging circuit, battery, or the like) is disconnected, for example. Then, the TX uses the power transmitting antenna capable of transmitting power to the target RX and calculates the power loss between the TX and the target RX. Also when the power loss between the TX and the RX is calculated during power transmission (or when the reception power value is received from the RX) in a similar state, the TX uses the power transmitting antenna capable of transmitting power to the target RX and calculates the power loss between the TX and the target RX. Thereafter, the power loss between the TX and the target RX calculated during power transmission and the power loss between the TX and the target RX in a state where there is no foreign object calculated in advance are compared, and whether or not there is a foreign object between the TX and the target RX is determined. Alternatively, the TX determines whether or not there is a foreign object between the TX and the target RX from the difference between the reception power value of the target RX received during power transmission and the reception power value of the target RX in a state where there is no foreign object.

In this manner, by looking at both the state of when the power loss between the TX and the RX in a state where there is no foreign object is calculated in advance and the power transmission and reception state (the characteristics of the power transmitting antenna or the like as described above) of when the power loss between the TX and the RX is calculated during power transmission, even in a wireless power transmission system in which a TX transmits power to a plurality of RXs, foreign object detection can be appropriate performed. Also, when a change in the power transmission and reception state is detected, a TX re-calculates "the power loss between the TX and the RX" described above.

In this manner, when the power loss between the TX and the RX in a state where there is no foreign object is calculated in advance and when the power loss between the TX and the RX during power transmission is calculated, the power transmission and reception state (for example, the characteristics of the power transmitting antenna, the characteristics of the power receiving antenna, the positional relationship between the TX (power transmitting antenna) and the RX, the effects of the RX 200 on the electrical characteristics of the power transmitting antenna 105b, the effects of the RX 210 on the electrical characteristics of the power transmitting antenna 105a, the state of the circuits inside the RX (for example, the connection state between the power receiving antenna and the load (charging circuit, battery, or the like)), and the like) can be made the same. Thus, foreign object detection can be appropriately performed with a wireless power transmission system in which a TX transmits power to a plurality of RXs.

System Configuration

The wireless power transmission system according to the present embodiment illustrated in FIGS. 11A to 11F will now be described in further detail. The TX 100 and the RXs 200, 210, and 220 are compliant with the WPC standard. The RXs 200, 210, and 220 are capable of receives power from the TX 100 and charging a battery. The TX 100 is an electronic device that wirelessly transmits power to the RXs 200, 210, and 220 placed on the TX 100. In the following examples, the RXs 200, 210, and 220 are placed on the TX 100. However, for the TX 100 to transmit power to the RXs 200, 210, and 220, as long as the RXs 200, 210, and 220 are within the power-transmittal range of the TX 100, the RXs 200, 210, and 220 may not be placed on the TX 100.

Also, the RXs 200, 210, and 220 and the TX 100 may have a function of executing an application other than non-contact charging. For example, the RXs 200, 210, and 220 may be smartphones, and an example of the TX 100 is an accessory device for charging the smartphone. The RXs 200, 210, and 220 and the TX 100 may be tablets, storage apparatuses, such as a hard disk device or a memory device, or may be information processing apparatuses, such as a personal computer (PC) or the like. Also, the RXs 200, 210, and 220 and the TX 100, for example, may be image input apparatuses, such as an image capture apparatus (a camera, a video camera, and the like) or a scanner, or may be image output apparatuses, such as a printer, copying machine, or a projector. Also, the TX 100 may be a smartphone. In this case, the RXs 200, 210, and 220 may be another smartphone or a wireless earphone. Also, the TX 100 may be a charger placed on the console or the like inside the vehicle.

In the present system, wireless power transmission is performed using an electromagnetic induction method for non-contact charging on the basis of the WPC standard. In other words, for the RXs 200, 210, and 220 and the TX 100, wireless power transmission is performed between the power receiving antenna 205 of the RXs 200, 210, and 220 and the power transmitting antennas (power transmitting coil) 105a to 105c of the TX 100 to perform non-contact charging based on the WPC standard. Note that the wireless power transmission system (non-contact power transmission method) used in the present system is not limited to that defined in the WPC standard, and other systems may be used, such as other electromagnetic induction systems, magnetic field resonance systems, electric field resonance systems, microwave systems, lasers, and the like. Also, in the present embodiment, the non-contact charging uses wireless power transmission. However, wireless power transmission may be used for a different purpose other than for non-contact charging.

Power transmission control according to the WPC standard will now be described using an example in which the TX is the TX 100 and the RX are the RXs 200, 210, and 220. In the WPC standard, the magnitude of the power guaranteed when power is received by the RXs 200, 210, and 220 from the TX 100 is defined as a value called Guaranteed Power (hereinafter, referred to as GP). GP indicates the power value of the guaranteed output to the load (for example, a circuit for charging, a battery, and the like) of the RXs 200, 210, and 220 even when the power transmitting efficiency between the power receiving antenna and the power transmitting antenna decreases due to the positional relationship between the RXs 200, 210, and 220 and the TX 100 changing, for example. For example, when the GP is 5 watts, even when the positional relationship between the power receiving antenna and the power transmitting antenna changes and the power transmitting efficiency is reduced, the TX 100 controls the power transmission in a manner such that 5 watts is output to the load in the RXs 200, 210, and 220.

Also, per the method specified in the WPC standard, the TX 100 detects the existence of an object (foreign object) that is not an RX near the TX 100 (near the power receiving antenna). The methods specifically specified are a power loss method in which a foreign object is detected using the difference between the transmitted power of the TX 100 and the reception power of the RXs 200, 210, and 220 and a Q-factor measurement method in which a foreign object is detected using the change in the quality coefficient (Q-factor) of the power transmitting antenna (power transmitting coil) of the TX 100. Foreign object detection using the power loss method is performed during transfer of power (power transmission) (in a Power Transfer phase described below). Also, foreign object detection using the Q-factor measurement method is performed before power transmission (in a Negotiation phase or Renegotiation phase described below).

The RXs 200, 210, and 220 and the TX 100 according to the present embodiment communicate to perform power transmission and reception control based on the WPC standard. The WPC standard defines a plurality of phases including a Power Transfer phase in which power is transmitted and one or more phases before actual power transmission. In these phases, communication is executed to control the transmitting and receiving of power as necessary. Pre-power transmission phases may include a Selection phase, a Ping phase, an Identification and Configuration phase, a Negotiation phase, and a Calibration phase. Note that hereinafter, the Identification and Configuration phase will be referred to as the I&C phase.

In the Selection phase, the TX 100 intermittently transmits an Analog Ping and detects if an object is placed on the TX 100 (for example, if the RXs 200, 210, and 220, a conductor piece, or the like is placed on the TX 100). The TX 100 detects at least a voltage value or a current value of a power transmitting antenna when the Analog Ping is transmitted, determines that an object exists in the case in which the voltage value is less than a threshold or the current value is greater than a threshold, and transitions to the Ping phase.

In the Ping phase, the TX 100 transmits a Digital Ping with more power than the Analog Ping. The magnitude of the power of the Digital Ping is sufficient enough to activate a control unit 201 (FIG. 2) of the RXs 200, 210, and 220 placed on the TX 100. The RXs 200, 210, and 220 notify the TX 100 of the magnitude of the received voltage. In this manner, by receiving a reply from the RXs 200, 210, and 220 that received the Digital Ping, the TX 100 recognizes that the objects detected in the selection phase are the RXs 200, 210, and 220. When the TX 100 receives a notification of the received voltage value, the process transitions to the I&C phase.

In the I&C phase, the TX 100 identifies the RXs 200, 210, and 220 and acquires device configuration information (capability information) from the RXs 200, 210, and 220. Accordingly, the RXs 200, 210, and 220 transmit an ID packet and a Configuration Packet to the TX 100. The ID packet includes the identification information of the RXs 200, 210, and 220, and the Configuration Packet includes the device configuration information (capability information) of the RXs 200, 210, and 220. The TX 100 having received the ID packet and the Configuration Packet replies with an acknowledge (ACK, affirmative reply). Then, the I&C phase ends.

In the Negotiation phase, the GP value is determined on the basis of the GP value requested by the RXs 200, 210, and 220, the power transmission capability of the TX 100, and the like. Also, the TX 100 executes foreign object detection processing using the Q-factor measurement method in accordance with the request from the RXs 200, 210, and 220. Also, in the WPC standard, a method is specified in which, after the Power Transfer phase has been transitioned to, a similar processing to the Negotiation phase is again executed at the request of the RX. The phase in which this processing is executed after transitioning from the Power Transfer phase is called the Renegotiation phase.

In the Calibration phase, on the basis of the WPC standard, the RXs 200, 210, and 220 notify the TX 100 of a predetermined reception power value (reception power value in a light load state/reception power value in a high load state), and the TX 100 performs adjustments to efficiently transmit power. The reception power value reported to the TX 100 can be used for foreign object detection processing using the power loss method.

In the Power Transfer phase, control is performed to start power transmission, continue power transmission, stop power transmission due to an error or a full charge, and the like. The TX 100 and the RXs 200, 210, and 220 perform communication using the same power transmitting antenna (power transmitting coil) used for wireless power transmission based on the WPC standard, for controlling the transmitting and receiving of power therebetween and superimposing a signal on the electromagnetic waves transmitted from the power transmitting antenna or the power receiving antenna. Note that the communicable range between the TX 100 and the RXs 200, 210, and 220 based on the WPC standard is roughly the same as the power-transmittal range of the TX 100.

Configuration of Power Transmitting Apparatus and Power Receiving Apparatus

Next, the configuration of a power transmitting apparatus and a power receiving apparatus according to the present embodiment will be described using FIGS. 1 and 2. FIG. 1 is a block diagram illustrating an example configuration of the power transmitting apparatus (TX) 100 according to the present embodiment. Also, FIG. 2 is a block diagram illustrating an example configuration of the power receiving apparatus (RX) 200 according to the present embodiment. Note that the RX 210 and the RX 220 have the same configuration as the RX 200. Note that the configuration described below is simply one example, and a part (or all parts) of the configuration described below may be replaced by other configurations with similar functions, may be omitted, or other configurations may be added in addition to the configurations described below. Furthermore, one block described in the description below may be one block divided into a plurality of blocks or may be a plurality of blocks merged as a single block. Also, for the functional blocks described below, the functions may be configured as software programs. However, a part or all parts included in each functional block may be configured as hardware.

The TX 100 (FIG. 1) will be described first. As illustrated in FIG. 1, the TX 100 includes a control unit 101, a power supply unit 102, a power transmitting unit 103, a communication unit 104, the power transmitting antennas 105a to 105c, a memory 106, and an antenna switching unit 107. The control unit 101, the power supply unit 102, the power transmitting unit 103, the communication unit 104, the memory 106, and the antenna switching unit 107 are illustrated as separate units in FIG. 1. However, from among these, any number of the functional blocks may be mounted on the same chip.

The control unit 101, for example, controls the entire TX 100 by executing a control program stored in the memory 106. Also, the control unit 101 executes control relating to power transmission control including communication for device authentication by the TX 100. Furthermore, the control unit 101 may execute control for executing an application other than wireless power transmission. The control unit 101, for example, includes one or more processors, such as a Central Processing Unit (CPU), a MicroProcessing Unit (MPU), or the like. Note that the control unit 101 may be configured as hardware dedicated to specific processing, such as an Application Specific Integrated Circuit (ASIC), or the like. Also, the control unit 101 may include an array circuit such as a Field Programmable Gate Array (FPGA) compiled so as to execute predetermined processing. The control unit 101 causes information stored during the execution of various types of processing to be stored in the memory 106. Also, the control unit 101 is capable of measuring time using a timer (not illustrated).

The power supply unit 102 supplies power to each functional block. The power supply unit 102, for example, is a commercial power supply or a battery. Power supplied from a commercial power supply is stored in the battery.

The power transmitting unit 103 converts direct current or alternating current power input from the power supply unit 102 to alternating current frequency power in a frequency band used for wireless power transmission and generates electromagnetic waves for reception by the RX by inputting the alternating current frequency power into the power transmitting antennas 105a to 105c. For example, the power transmitting unit 103 converts DC voltage supplied by the power supply unit 102 to AC voltage at a switching circuit with a half bridge or full bridge configuration using Field Effect Transistors (FETs). In this case, the power transmitting unit 103 includes a gate driver that controls switching the FETs on and off.

Also, the power transmitting unit 103 controls the intensity of the electromagnetic waves output by adjusting either one or both of the voltage (power transmission voltage) and the current (power transmission current) input to the power transmitting antennas 105a to 105c via control by the control unit 101. If power transmission voltage or power transmission current is increased, the intensity of electromagnetic waves is increased, and if power transmission voltage or power transmission current is decreased, the intensity of electromagnetic waves is decreased. In addition, on the basis of an instruction from the control unit 101, the power transmitting unit 103 performs output control of the alternating current frequency power to start or stop power transmission from the power transmitting antennas 105a to 105c. Also, the power transmitting unit 103 has the capability to supply power corresponding to outputting 15 watts (W) of power to a charge unit (in the case of the RXs 200 to 220, a charge unit 206 (FIG. 2) of the RX 200 power according to the WPC standard.

The communication unit 104 performs communication with the RX for power transmission control based on the WPC standard as described above via control by the control unit 101. The communication unit 104 performs communication including modulating the electromagnetic waves output from the power transmitting antennas 105a to 105c and transmitting information to the RX. Also, the communication unit 104 demodulates the electromagnetic waves modulated at the RX outputs from the power transmitting antennas 105a to 105c and obtained the information transmitted by the RX. In other words, communication performed by the communication unit 104 is performed by superimposition of a signal on electromagnetic waves transmitted from the power transmitting antennas 105a to 105c. Also, the communication unit 104 may communicate with the RX via communication using a standard other than the WPC standard using an antenna other than the power transmitting antennas 105a to 105c, or the communication unit 104 may communicate with the RX selectively using a plurality of communications.

The memory 106 may store the control program as well as the state of the TX 100 and the RX (reception power value and the like). For example, the state of the TX 100 may be obtained by the control unit 101, the state of the RX may be obtained by an RX control unit (in the case of the RXs 200 to 220, the control unit 201 (FIG. 2)), and these may be received via the communication unit 104.

The plurality of power transmitting antennas (coils) 105a to 105c are connected to the antenna switching unit 107. The antenna switching unit 107 selects and switches to one or more of the plurality of antennas (coils). Note that in FIG. 1, the three power transmitting antennas 105a to 105c are illustrated. However, the number of power transmitting coils is not limited to this number. Also, hereinafter, the power transmitting antennas 105a to 105c may be referred to as the power transmitting antenna 105.

Next, the RX 200 (FIG. 2) will be described. As described above, the RX 210 and the RX 220 have the same configuration as the RX 200. As illustrated in FIG. 2, the RX 200 includes the control unit 201, a user interface (UI) unit 202, a power receiving unit 203, a communication unit 204, the power receiving antenna 205, a charge unit 206, a battery 207, a memory 208, and a switching unit 209. Note that the plurality of functional blocks illustrated in FIG. 2 may be implemented as a single hardware module.

The control unit 201, for example, controls the entire RX 200 by executing a control program stored in the memory 208. In other words, the control unit 201 controls the functional units illustrated in FIG. 2. Furthermore, the control unit 201 may execute control for executing an application other than wireless power transmission. In one example, the control unit 201 includes one or more processors, such as a CPU, an MPU, or the like. Note that the entire RX 200 (in a case where the RX 200 is a smart phone, the entire smart phone) may be controlled in cooperation with the operating system (OS) executed by the control unit 201.

Also, the control unit 201 may be configured as hardware dedicated to a specific processing such as an ASIC. Also, the control unit 201 may include an array circuit such as an FPGA compiled so as to execute predetermined processing. The control unit 201 causes information stored during the execution of various types of processing to be stored in the memory 208. Also, the control unit 201 is capable of measuring time using a timer (not illustrated).

The UI unit 202 performs various types of output to the user. Herein, outputting in various manners refers to an operation such as screen display, flashing or changing the color of LEDS, audio output via a speaker, vibration of the RX 200 body, and the like. The UI unit 202 is implemented by a liquid crystal panel, a speaker, a vibration motor, or the like.

The power receiving unit 203, at the power receiving antenna 205, obtains AC power (AC voltage and AC current) generated by electromagnetic induction caused by electromagnetic waves emitted from the power transmitting antenna 105 of the TX 100. Also, the power receiving unit 203 converts the AC power to DC or AC power of a predetermined frequency and outputs the power to the charge unit 206 that executes processing to charge the battery 207. In other words, the power receiving unit 203 supplies power to a load in the RX 200. GP as described above is the amount of power guaranteed to be output from the power receiving unit 203. The power receiving unit 203 is capable of supplying power for the charge unit 206 to charge the battery 207 and supplying power corresponding to outputting 15 watts to the charge unit 206. The switching unit 209 is configured to control whether or not the received power is supplied to the battery (load). By connecting the charge unit 206 and the battery 207 via the switching unit 209, the received power is supplied to the battery 207. By disconnecting the connection between the charge unit 206 and the battery 207 via a switch and the switching unit 209, the received power is not supplied to the battery 207. Note that, as illustrated in FIG. 2, the switching unit 209 is disposed between the charge unit 206 and the battery 207, but may be disposed between the power receiving unit 203 and the charge unit 206. In FIG. 2, the switching unit 209 illustrated as a single block. However, alternatively, the switching unit may be implemented as a part of the charge unit 206. The communication unit 204 performs communication for power reception control based on the WPC standard as described above with the communication unit 104 of the TX 100. The communication unit 204 demodulates the electromagnetic waves received from the power receiving antenna 205 and obtains the information transmitted from the TX 100. Also, the communication unit 204 performs communications with the TX 100 by superimposing, on electromagnetic waves, a signal relating to the information to be transmitted to the TX 100 via load modulation of the received electromagnetic waves. Note that, the communication unit 204 may communicate with the TX 100 via communication using a standard other than the WPC standard using an antenna other than the power receiving antenna 205, or the communication unit 204 may communicate with the TX 100 selectively using a plurality of communications.

The memory 208 stores the control program as well as the state of the TX 100 and the RX 200. For example, the state of the RX 200 may be obtained by the control unit 201, the state of the TX 100 may be obtained by the control unit 101 of the TX 100, and these may be received via the communication unit 204.

Functional Configuration of Control Unit of Power Transmitting Apparatus

Figure 3:
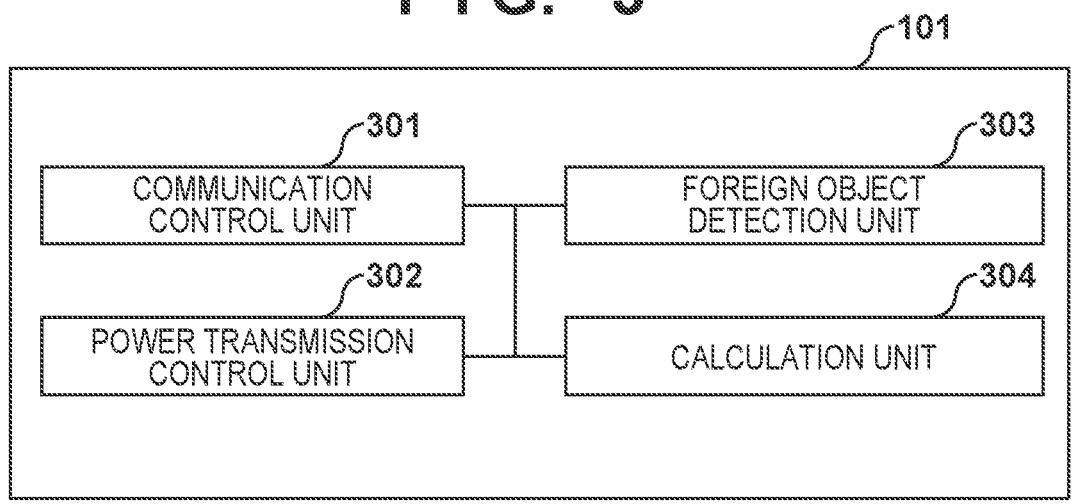
FIG. 3 is a block diagram illustrating an example of the functional configuration of a control unit of the power transmitting apparatus.

Next, the functional configuration of the control unit 101 of the TX (power transmitting apparatus) 100 according to the present embodiment will be described using FIG. 3. FIG. 3 is a block diagram illustrating an example of the functional configuration of the control unit 101. The control unit 101 includes a communication control unit 301, a power transmission control unit 302, a foreign object detection unit 303, and a calculation unit 304.

The communication control unit 301 is a processing unit that performs communicate control with the RX based on the WPC standard via the communication unit 104. The power transmission control unit 302 is a processing unit that controls the power transmitting unit 103 and controls transmitting power to the RX. The foreign object detection unit 303 is a processing unit that measures the transmission power at the power transmitting unit 103 and the Q-factor at the power transmitting antenna 105 and detects foreign objects. The foreign object detection unit 303 may implement a foreign object detection function via the power loss method and a foreign object detection function via the Q-factor measurement method. Also, the foreign object detection unit 303 may execute foreign object detection processing using another method. For example, when the TX has a Near Field Communication (NFC) communication function, foreign object detection processing may be executed using an opposing device detection function using an NFC standard. Also, in addition to the function of detecting foreign objects, the foreign object detection unit 303 may also be capable of detecting a change in the state of the TX 100. For example, an increase or decrease in the number of RXs on the TX 100 can be detected. The calculation unit 304 measures the power output to the RX via the power transmitting unit 103 and calculates the average output power value per unit time. The foreign object detection unit 303 executes foreign object detection processing using the power loss method on the basis of the calculation result from the calculation unit 304 and the reception power information received from the RX via the communication control unit 301.

The functions of the communication unit 301, the power transmission control unit 302, the foreign object detection unit 303, and the calculation unit 304 are implemented as programs operating via the control unit 101. Each processing unit may be configured as an independent program and operate in parallel with the programs being in sync via event processing or the like.

Flow of Processing by Power Transmitting Apparatus

Figure 4A:
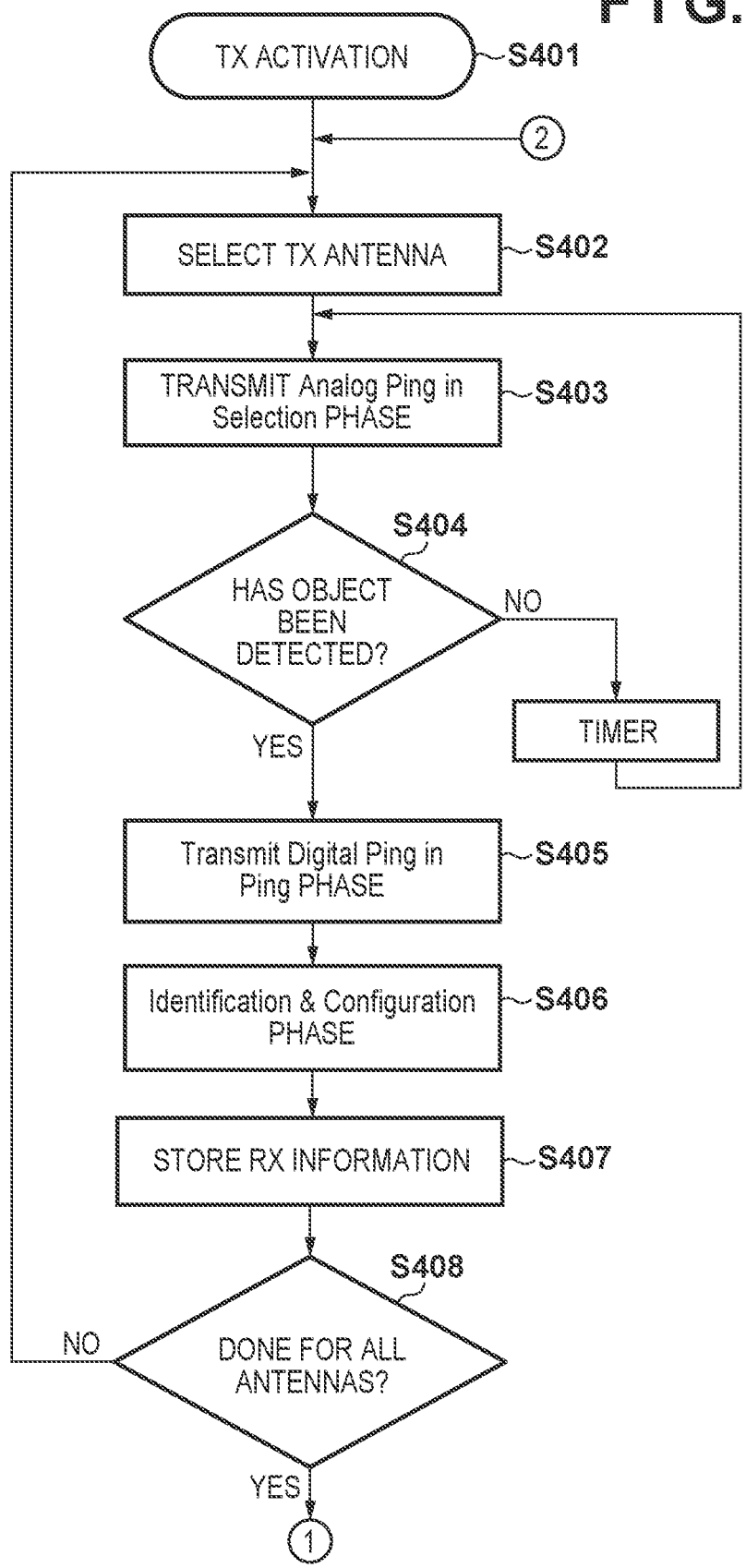
FIG. 4A is a flowchart of the processing executed by the power transmitting apparatus according to a first embodiment.
Figure 4B:
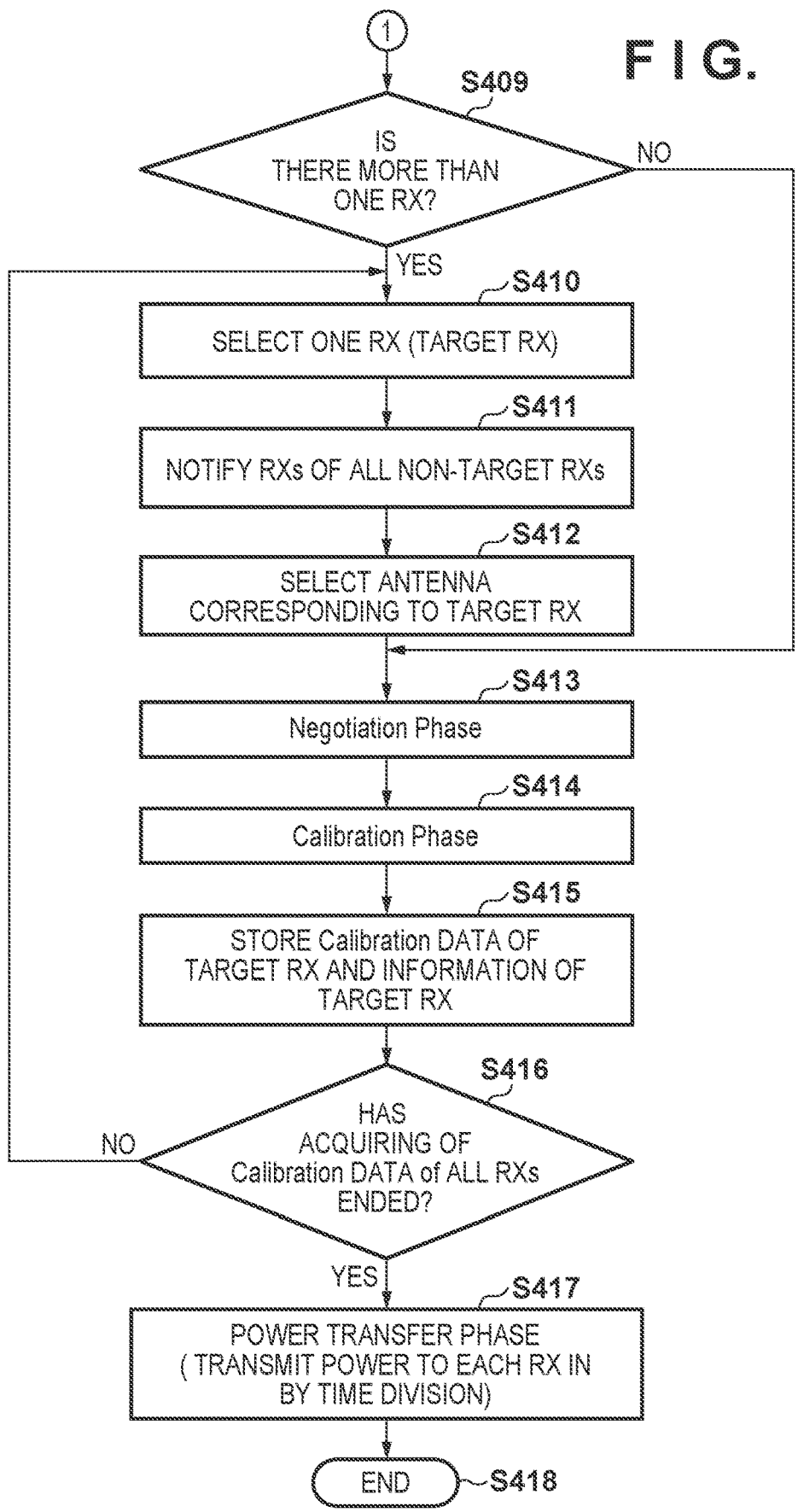
FIG. 4B is a flowchart of the processing executed by the power transmitting apparatus according to the first embodiment.

Next, the flow of the processing executed by the TX 100 will be described. FIGS. 4A and 4B are flowcharts illustrating the processing executed by the TX 100 according to the present embodiment. The present processing can be implemented by the control unit 101 of the TX 100 executing a program read out from the memory 106, for example. Note that at least a part of the process described below may be implemented by hardware. In the case of implementing processing by hardware, for example, using a predetermined compiler, the processing can be implemented by automatically generating a dedicated circuit that uses a gate array such as an FPGA from a program for implementing each type of processing.

When the TX 100 starts up, the present processing starts (Step S401). Alternatively, the present processing may start in response to an non-contact charging application start instruction entered via an input unit (not illustrated) by the user of the TX 100 or in response to the TX 100 being connected to a commercial power supply and being supplied with power. Also, the present processing may be started by another trigger. When the present processing starts, the antenna switching unit 107 of the TX 100 selects on power transmitting antenna from the plurality of power transmitting antennas (power transmitting coil) via control by the control unit 101 (step S402). Next, the Selection phase is transitioned to by the TX 100, then the communication control unit 301 transmits an Analog Ping (step S403), and the TX 100 determines whether or not an object has been detected (step S404). When an object has not been detected, the communication control unit 301 continues to periodically transmit an Analog Ping. When an object is detected in step S404 (Yes in step S404), the Ping phase is transitioned by the TX 100, and the communication control unit 301 transmits a Digital Ping (step S405). Then, the foreign object detection unit 303 recognizes that the detected object is the RX. Next, the Identification & Configuration phase is transitioned to by the TX 100, and the communication control unit 301 acquires information (device configuration information (capability information) and RX identification information) of the RX from the RX (step S406). Next, in step S407, the control unit 101 stores information including the RX information obtained in step S406 and the power transmitting antenna which detected the RX associated together in the memory 106.

Next, in step S408, the control unit 101 determines whether all of the power transmitting antenna selection and switching has been completed. When all of the antenna switching has not been completed, the processing moves to step S402, and the control unit 101 controls the antenna switching unit 107 to select another power transmitting antenna. When it is determined that all of the power transmitting antenna selection and switching has been completed in step S408, the processing proceeds to step S409.

By the TX 100 executing the processing from step S401 to step S408, each power transmitting antenna (power transmitting coil) of the TX 100 and the RXs able to be recognized by the power transmitting antennas can be associated together. Also, the TX 100 can recognize the information of all of the RXs on the TX 100.

Next, in step S409, the control unit 101 determines whether or not more than one RX is placed on the TX 100 from the result of the processing from step S401 to step S408. In step S409, when it is determined that there are more than one RX placed on the TX 100 (Yes in step S409), the processing proceeds to step S410. When it is determined that there is one RX placed on the TX 100 (No, in step S409), the processing proceeds to step S413. In step S410, the control unit 101 selects one RX from the plurality of RXs. Hereinafter, in the description using FIG. 4B, the one RX selected in step S410 is referred to as the target RX. Then, in step S411, the communication control unit 301 transmits a message to the RXs (non-target RXs) other than the target RX so that they recognized that they were not selected.

The message may be a message for notifying all of the RXs of the information of the target RX (selected RX) or may be a message for notifying all of the RXs of the information of the non-target RXs (not selected RXs). These messages must be used to notify all of the RXs on the TX 100 and thus are transmitted from all of the power transmitting antennas 105 of the TX 100. Alternatively, information indicating non-selection may be reported using the non-target RXs as the destination. The messages are transmitted from the power transmitting antenna 105 capable of communicating with at least the non-target RXs. Alternatively, information indicating selection may be reported using the target RX as the destination. In this case, by not receiving a message reporting the information indicating selection within a predetermined time, the non-target RXs recognize that they were not selected. Also, the messages are transmitted from the power transmitting coil capable of communicating with at least the target RX.

When the non-target RXs receive the message, control is performed to put the non-target RXs in a state in which no charge or power is supplied from the TX 100 (for example, the connection with the load (charging circuit, battery, or the like) is disconnected. In other words, the RX performs control to disconnect the load (charging circuit, battery, or the like) via the switching unit 209 (FIG. 2) and stop supply of the received power to the load (charging circuit, battery, or the like).

Next, in step S412, the control unit 101 of the TX 100 selects the power transmitting antenna (power transmitting coil) capable of transmitting power to the target RX (corresponding to the target RX), and the antenna is used to communicate with the target RX and establish a power transmission ready state. Next, the Negotiation phase is transitioned to by the TX 100 (step S413), and then the Calibration phase is transitioned to by the TX 100 (step S414). In the Calibration phase, on the basis of the WPC standard, the target RX notifies the TX 100 of a predetermined reception power value (reception power value in a light load state/reception power value in a high load state), and the TX 100 performs adjustments to efficiently transmit power. The reception power value reported to the TX 100 can be used for foreign object detection processing using the power loss method.

In the Calibration phase, the TX 100 derives the relationship of the reception power in relation to the transmission power in a state where there is no foreign object as described above using FIG. 10. Specifically, the foreign object detection unit 303 of the TX 100, on the basis of the WPC standard, derives (corresponding to the straight line 1002 in FIG. 10) data (power loss data) indicating the power loss between the TX and the RX in a state where there is no foreign object using a predetermined reception power value acquired from RX (including the reception power value in a light load state/Light Load and the reception power value in a maximum load state/Connected Load state). Hereinafter, the power loss data is referred to as Calibration data. The Calibration data can be used in the foreign object detection processing using the power loss method to derive data (a threshold) corresponding to a power loss reference. Foreign object detection based on the power loss method is as described above. In other words, when the power loss between the TX and the RX during power transmission calculated using the transmission power value corresponding to the power transmitted by the TX and the reception power value at the RX received during power transmission by the TX is equal to or greater than a predetermined threshold based on the Calibration data, the TX determines that "there is a foreign object" or that "there is a possibility that there is a foreign object".

In step S415, the control unit 101 associates together the Calibration data acquired in the Calibration phase and the information of the target RX (step S407) and stores them in the memory 106. Then, in step S416, the control unit 101 determines whether or not Calibration data of all of the RXs placed on the TX 100 has been acquired. Since the information of all of the RXs on the TX 100 have been obtained by the TX 100 in the processing from step S401 to step S408, the determination can be performed by checking whether the information of the RXs and the Calibration data acquired in step S415 are all associated.

According to the processing from step S409 to step S416 as described above, the TX 100 can individually acquire (derive) time-divided Calibration data for each RX for all of the RXs placed on the TX 100. Next, in step S417, the Power Transfer phase is transitioned to by the TX 100. Then, in step S418, the processing ends.

Figure 5:
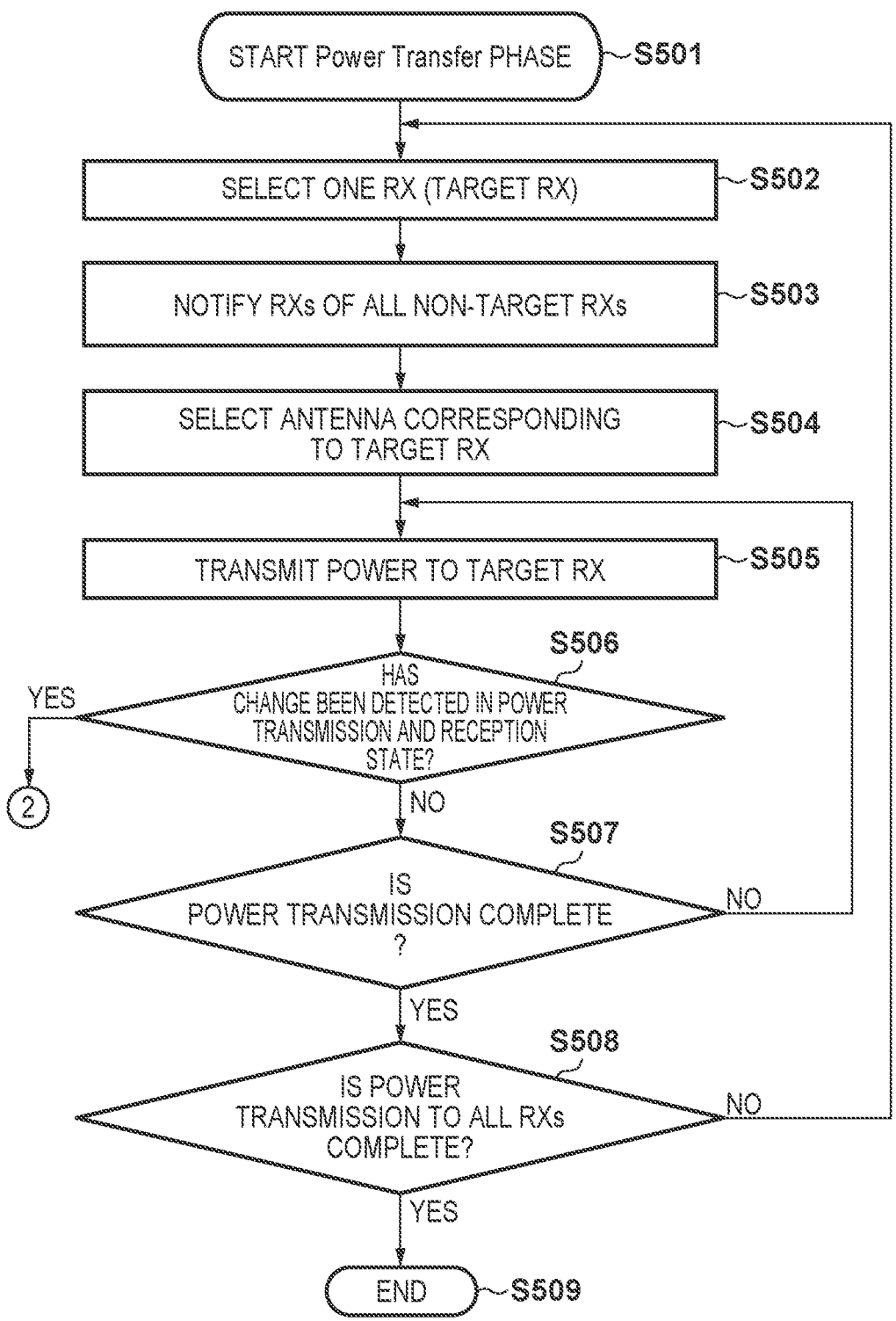
FIG. 5 is a flowchart of the processing of the Power Transfer phase according to the first embodiment.

In the Power Transfer phase (step S417), the TX 100 performs control so that power is transmitted using a time-division method to the plurality of RXs placed on the TX 100. The operations in the Power Transfer phase will be described in detail below using FIG. 5. FIG. 5 is a flowchart of the processing of the Power Transfer phase according to the present embodiment. Note that in the time-division method, different power transmission periods are allocated to the plurality of power receiving apparatuses, and power is supplied to each power receiving apparatus within their allocated power transmission period.

When TX 100 starts the Power Transfer phase (step S501), the control unit 101 selects one RX as the power transmission target from the plurality of RXs placed on the TX 100 (step S502). Hereinafter, in the description using FIG. 5, the one RX selected in step 5502 is referred to as the target RX. Then, in step S503, the communication control unit 301 transmits a message to the RXs (non-target RXs) other than the target RX so that they recognized that they were not selected. The message is similar to the message using for notification in step S411 of FIG. 4B, and thus description thereof is omitted.

When the non-target RXs receive the message, control is performed to put the non-target RXs in a state in which no charge or power is supplied from the TX 100 (for example, the connection with the load (charging circuit, battery, or the like) is disconnected. In other words, the non-target RX performs control to disconnect the load (charging circuit, battery, or the like) via the switching unit 209 (FIG. 2) and stop supply of the received power to the load (charging circuit, battery, or the like). Next, in step S504, the control unit 101 of the TX 100 selects the power transmitting antenna (power transmitting coil) capable of transmitting power to the target RX (corresponding to the target RX), and the antenna is used to communicate with the target RX and establish a power transmission ready state. Then, in step S505, the power transmission control unit 302 transmits power to the target RX.

During power transmission, the foreign object detection unit 303 detects any change (change in the state on the TX 100) in the power transmission and reception state in the power-transmittal range of the TX 100 (step S506). For example, the foreign object detection unit 303 detects a foreign object via the power loss method described above using the Calibration data of the target RX acquired in the Calibration phase (step S414 of FIG. 4B). When a foreign object is detected (Yes in step S506), the processing returns to step S402 of FIG. 4A (post-TX-start-up processing). However, the change in the power transmission and reception state may be due to an increase or decrease in the number of the RXs placed on the TX 100 and not due to a foreign object. Even in the case of an increase or decrease of the number of RXs on the TX 100, since there is a change in the power loss as described above, the foreign object detection unit 303 can detect an increase or decrease in the number of RXs on the TX 100 using the power loss.

When a change in the power transmission and reception state is detected in step S506, by returning to the post-TX-start-up during the processing flow of FIGS. 4A and 4B, even if there is an increase or decrease in the number of the RXs placed on the TX 100, power can be appropriately transmitted to all of the RXs. The foreign object detection unit 303 of the TX 100 periodically monitors for changes in the power transmission and reception state during power transmission by the power transmission control unit 302 until power transmission is complete (No in step S506, No in step S507). When power transmission ends without a change in the power transmission and reception state being detected by the TX 100 (Yes in step S507), the TX 100 stores the information of the target RX (RX having completed power transmission) in the memory 106. Then, the processing proceeds to step S508, and the control unit 101 references the information of the RXs already stored and determines whether power transmission to all of the RXs is complete. When power transmission to all of the RXs is complete, the processing ends at step S509. When power transmission to all of the RXs is not complete, the processing returns to step S502 (after the start of the Power Transfer phase). Note that completion of power transmission may be confirmed by the communication control unit 301 of the TX 100 receiving an End Power Transfer as per the WPC standard from the power transmission target RX (this also applies to the following description).

Via the processing from step S501 to step S509 described above, the TX 100 can transmit power to the plurality of RXs placed on the TX 100 using a time-division method and appropriately complete power transmission to all of the RXs.

In this manner, in the present embodiment, first, the TX 100 sets a specific RX from among the plurality of RXs placed on the TX 100 as the target RX and then derives (acquires) the Calibration data of the target RX after performing control so that no charge or power is supplied to the non-target RXs from the TX 100 (FIGS. 4A and 4B). Then, the TX 100 acquires the Calibration data for all of the RXs. Thereafter, in the Power Transfer phase, the TX 100 sets a specific RX from among the plurality of RXs placed on the TX 100 as the target RX and uses the already derived Calibration data to transmit power to the target RX after performing control so that no charge or power is supplied to the non-target RXs from the TX 100 (FIG. 5). In this manner, by making the state of each RX when deriving the Calibration data and the state of each RX when power transmission is performed the same, the TX 100 can be appropriately complete power transmission to all of the RXs.

Second Embodiment

In the first embodiment described above, a control method is used to appropriately transmit power to the plurality of RXs. In the present embodiment, a different control method is used to appropriately transmit power to the plurality of RXs. The differences from the first embodiment will be described below, and common components will not be described.

Flow of Processing by Power Transmitting Apparatus

Figure 6:
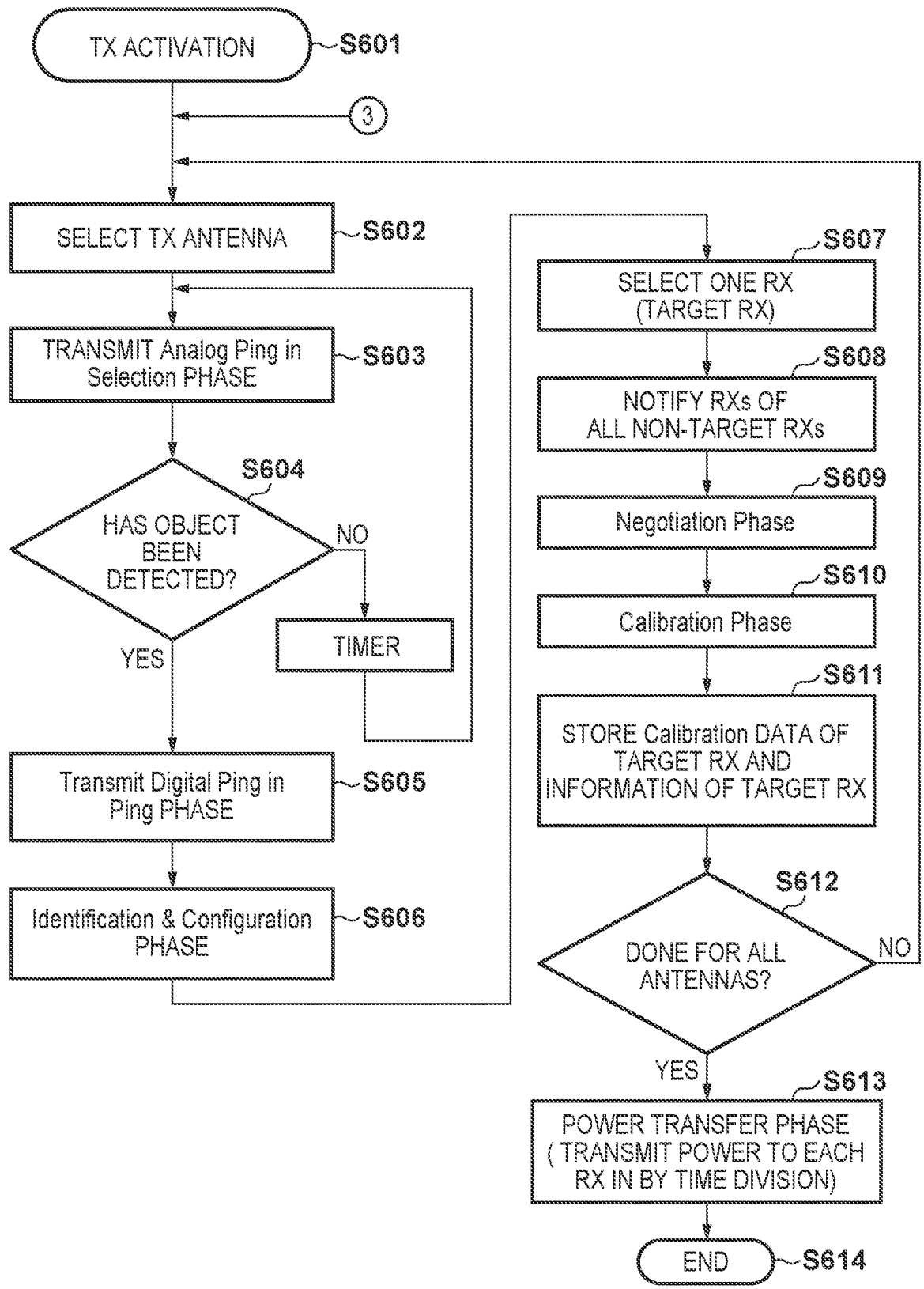
FIG. 6 is a flowchart of the processing executed by a power transmitting apparatus according to a second embodiment.

FIG. 6 is a flowchart illustrating the processing executed by the TX 100 according to the present embodiment. The present processing can be implemented by the control unit 101 of the TX 100 executing a program read out from the memory 106, for example. Note that at least a part of the process described below may be implemented by hardware. In the case of implementing processing by hardware, for example, using a predetermined compiler, the processing can be implemented by automatically generating a dedicated circuit that uses a gate array such as an FPGA from a program for implementing each type of processing.

The processing of steps S601 to S606 is similar to the processing of steps S401 to S406 of the first embodiment illustrated in FIG. 4A, and thus description thereof will be omitted. In step S607, the control unit 101 selects one RX. The RX may be the RX detected using the power transmitting antenna selected in step S602. Hereinafter, in the description using FIG. 6, the one RX selected in step S607 is referred to as the target RX. Then, in step S608, the communication control unit 301 transmits a message to the RXs (non-target RXs) other than the target RX so that they recognized that they were not selected. The message is similar to the message using for notification in step S411 of FIG. 4B, and thus description thereof is omitted.

When the non-target RXs receive the message, control is performed to put the non-target RXs in a state in which no charge or power is supplied from the TX 100 (for example, the connection with the load (charging circuit, battery, or the like) is disconnected. In other words, the non-target RX performs control to disconnect the load (charging circuit, battery, or the like) via the switching unit 209 (FIG. 2) and stop supply of the received power to the load (charging circuit, battery, or the like).

Next, the Negotiation phase is transitioned to by the TX 100 (step S609), and then the Calibration phase is transitioned to by the TX 100 (step S610). In the Calibration phase, on the basis of the WPC standard, the target RX notifies the TX 100 of a predetermined reception power value (reception power value in a light load state/reception power value in a high load state), and the power transmission control unit 302 of the TX 100 performs adjustments to efficiently transmit power. The reception power value reported to the TX 100 can be used for foreign object detection processing using the power loss method. The processing in the Calibration phase is similar to the processing of step S414 of FIG. 4B, and thus description thereof is omitted.

In step S611, the control unit 101 associates together the Calibration data acquired in the Calibration phase and the information (device configuration information (capability information) and RX identification information) of the target RX acquired in step S606 and stores them in the memory 106. Then, in step S612, the control unit 101 determines whether all of the power transmitting antenna selection and switching has been completed.

According to the processing from step S602 to step S612 as described above, the TX 100 can individually acquire (derive) time-divided Calibration data for each RX for all of the RXs placed on the TX 100. Next, in step S613, the Power Transfer phase is transitioned to by the TX 100. Then, in step S614, the processing ends.

Figure 7:
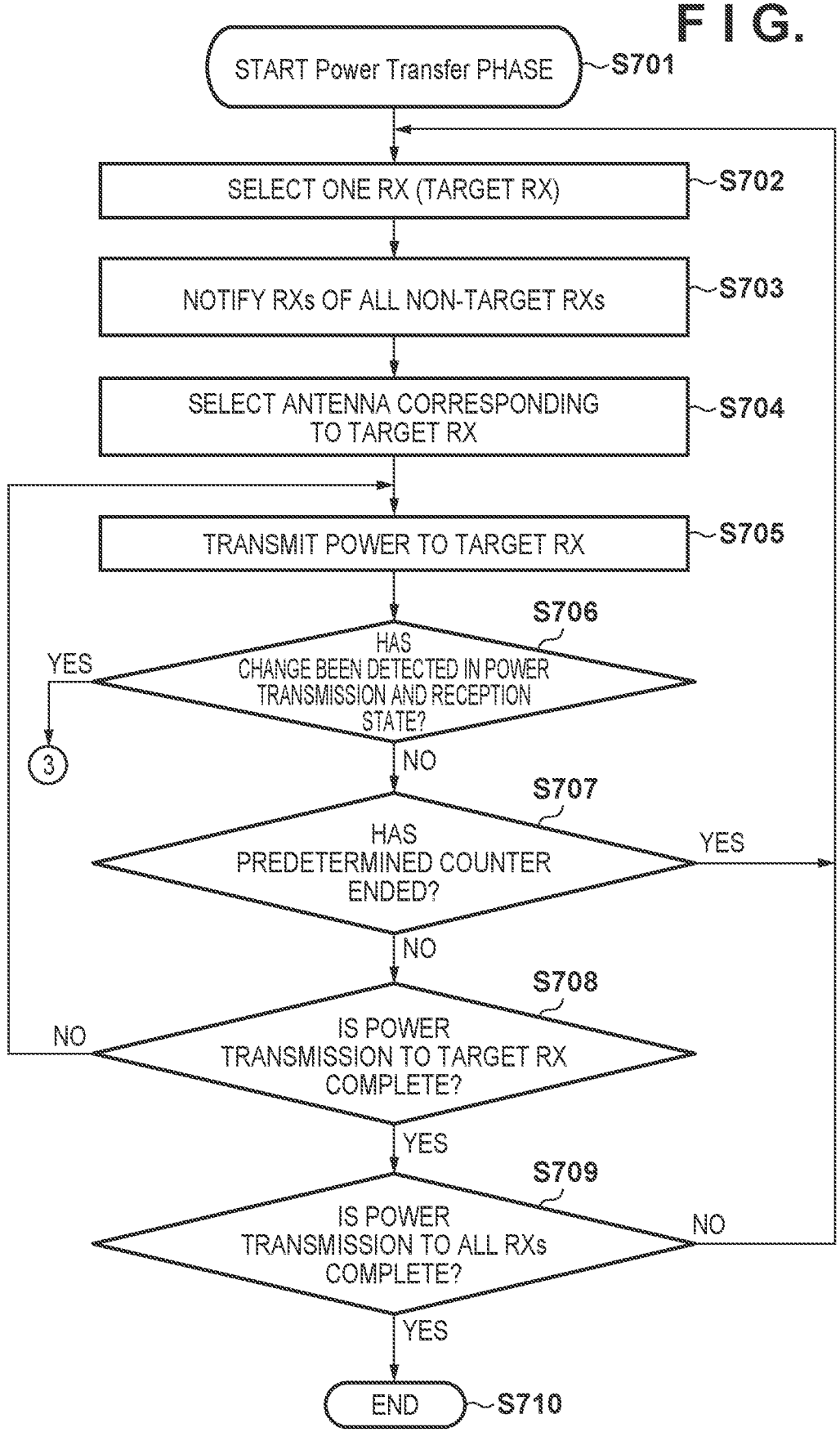
FIG. 7 is a flowchart of the processing of the Power Transfer phase according to the second embodiment.

In the Power Transfer phase (step S613), the TX 100 performs control so that power is transmitted using time-division to the plurality of RXs placed on the TX 100. The operations in the Power Transfer phase will be described in detail below using FIG. 7. FIG. 7 is a flowchart of the processing of the Power Transfer phase according to the present embodiment. The processing of steps S701 to S704 are similar to the processing of steps S501 to S504 of FIG. 5, and thus description thereof will be omitted. After the processing of step S704, in step S705, the power transmission control unit 302 transmits power to the target RX.

During power transmission, the foreign object detection unit 303 detects any change (change in the state on the TX 100) in the power transmission and reception state in the power-transmittal range of the TX 100 (step S706). For example, the foreign object detection unit 303 detects a foreign object via the power loss method described above using the Calibration data of the target RX acquired in the Calibration phase (step S610 of FIG. 6). When a foreign object is detected, the processing returns to step S602 of FIG. 6 (post-TX-start-up processing). However, the change in the power transmission and reception state may be due to an increase or decrease in the number of the RXs placed on the TX 100 and not due to a foreign object. Even in the case of an increase or decrease of the number of RXs on the TX 100, since there is a change in the power loss as described above, the foreign object detection unit 303 can detect an increase or decrease in the number of RXs on the TX 100 using the power loss.

When a change in the power transmission and reception state is detected in step S706, by returning to the post-TX-start-up during the flow of FIG. 6, even if there is an increase or decrease in the number of the RXs placed on the TX 100, power can be appropriately transmitted to all of the RXs. When a change in the power transmission and reception state is not detected, the processing proceeds to step S707, and the control unit 101 determines whether or not a predetermined counter (a period specified by a predetermined counter) has ended. The counter is a counter for counting time, the number of times power is transmitted in intermittent power transmission, or the number of packets or the number of frames for communication, or the like, for example. When the counter has ended (for example, the predetermined condition/number has been satisfied) in step S707 (Yes in step S707), the processing returns to step S702 and the TX 100 selects another RX to transmit power to.

When the predetermined counter has not ended in step S707 (No in step S707), the processing proceeds to step S708 and the control unit 101 determines whether or not power transmission to the target RX is complete. When the result of the determination is that, for example, a full charge has not been reached and the power transmission is not complete, the processing returns to step S705 and the power transmission control unit 302 continues power transmission. When it is determined that power transmission to the target RX is complete in step S708, the processing proceeds to step S709, and the control unit 101 determines whether or not power transmission to all of the RXs is complete. When power transmission to all of the RXs is not complete, the processing returns to step S702, and the control unit 101 selects another RX for which power transmission is not complete, and the power transmission control unit 302 transmits power to the selected RX (target RX). When power transmission to all of the RXs placed on the TX 100 is complete, the processing proceeds to step S710 and ends.

In this manner, in the present embodiment, first, the TX 100 sets a specific RX from among the plurality of RXs placed on the TX 100 as the target RX and then derives (acquires) the Calibration data of the target RX after performing control so that no charge or power is supplied to the non-target RXs from the TX 100 (FIG. 6). Then, the TX 100 acquires the Calibration data for all of the RXs. Thereafter, in the Power Transfer phase, the TX 100 sets a specific RX from among the plurality of RXs placed on the TX 100 as the target RX and uses the already derived Calibration data to transmit power to the target RX after performing control so that no charge or power is supplied to the non-target RXs from the TX 100 (FIG. 7). In this manner, by making the state of each RX when deriving the Calibration data and the state of each RX when power transmission is performed the same, the TX 100 appropriately complete power transmission to all of the RXs.

Note that the first embodiment was described on the basis of the flow illustrated in FIGS. 4A, 4B, and 5, and the second embodiment was described on the basis of the flow illustrated in FIGS. 6 and 7. However, these combinations can be changed, and a processing combining the flows illustrated in FIGS. 4A, 4B, 5, 6, and 7 can be implemented.

Third Embodiment

In the first embodiment and the second embodiment described above, a control method is used to appropriately transmit power to the plurality of RXs. In the present embodiment, a different control method is used to appropriately transmit power to the plurality of RXs. The differences from the first and second embodiment will be described below, and common components will not be described.

Flow of Processing by Power Transmitting Apparatus

Figure 8:
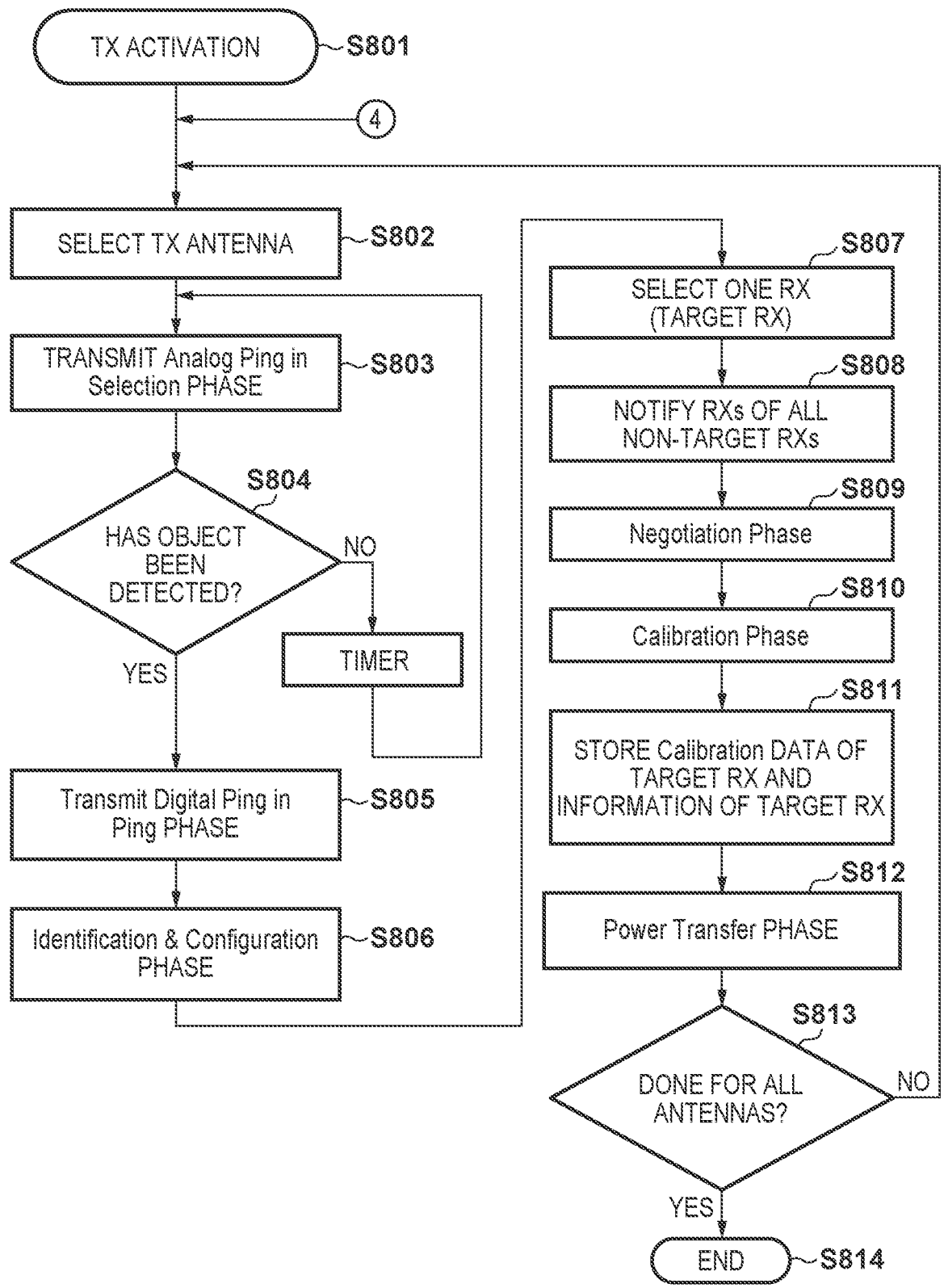
FIG. 8 is a flowchart of the processing executed by a power transmitting apparatus according to a third embodiment.

FIG. 8 is a flowchart illustrating the processing executed by the TX 100 according to the present embodiment. The present processing can be implemented by the control unit 101 of the TX 100 executing a program read out from the memory 106, for example. Note that at least a part of the process described below may be implemented by hardware. In the case of implementing processing by hardware, for example, using a predetermined compiler, the processing can be implemented by automatically generating a dedicated circuit that uses a gate array such as an FPGA from a program for implementing each type of processing.

The processing of steps S801 to S806 is similar to the processing of steps S401 to S406 of the first embodiment illustrated in FIG. 4A, and thus description thereof will be omitted. In step S807, the control unit 101 selects one RX. The RX may be the RX detected using the power transmitting antenna selected in step S802. Hereinafter, in the description using FIG. 8, the one RX selected in step S807 is referred to as the target RX. Then, in step S808, the communication control unit 301 transmits a message to the RXs (non-target RXs) other than the target RX so that they recognized that they were not selected. The message is similar to the message using for notification in step S411 of FIG. 4B, and thus description thereof is omitted.

When the non-target RXs receive the message, control is performed to put the non-target RXs in a state in which no charge or power is supplied from the TX 100 (for example, the connection with the load (charging circuit, battery, or the like) is disconnected. In other words, the non-target RX performs control to disconnect the load (charging circuit, battery, or the like) via the switching unit 209 (FIG. 2) and stop supply of the received power to the load (charging circuit, battery, or the like).

Next, the Negotiation phase is transitioned to by the TX 100 (step S809), and then the Calibration phase is transitioned to by the TX 100 (step S810). In the Calibration phase, on the basis of the WPC standard, the target RX notifies the TX 100 of a predetermined reception power value (reception power value in a light load state/reception power value in a high load state), and the power transmission control unit 302 of the TX 100 performs adjustments to efficiently transmit power. The reception power value reported to the TX 100 can be used for foreign object detection processing using the power loss method. The processing in the Calibration phase is similar to the processing of step S414 of FIG. 4B, and thus description thereof is omitted.

In step S811, the control unit 101 associates together the Calibration data acquired in the Calibration phase and the information (device configuration information (capability information) and RX identification information) of the target RX acquired in step S806 and stores them in the memory 106.

Next, in step S812, the Power Transfer phase is transitioned to by the TX 100. Then, in step S813, the control unit 101 determines whether all of the power transmitting antenna selection and switching has been completed. When all of the antenna switching has not been completed, the processing returns to step S802, and the control unit 101 selects another antenna that has not been selected. When all of the antenna switching has been completed, the processing proceeds to step S814 and ends.

Figure 9:
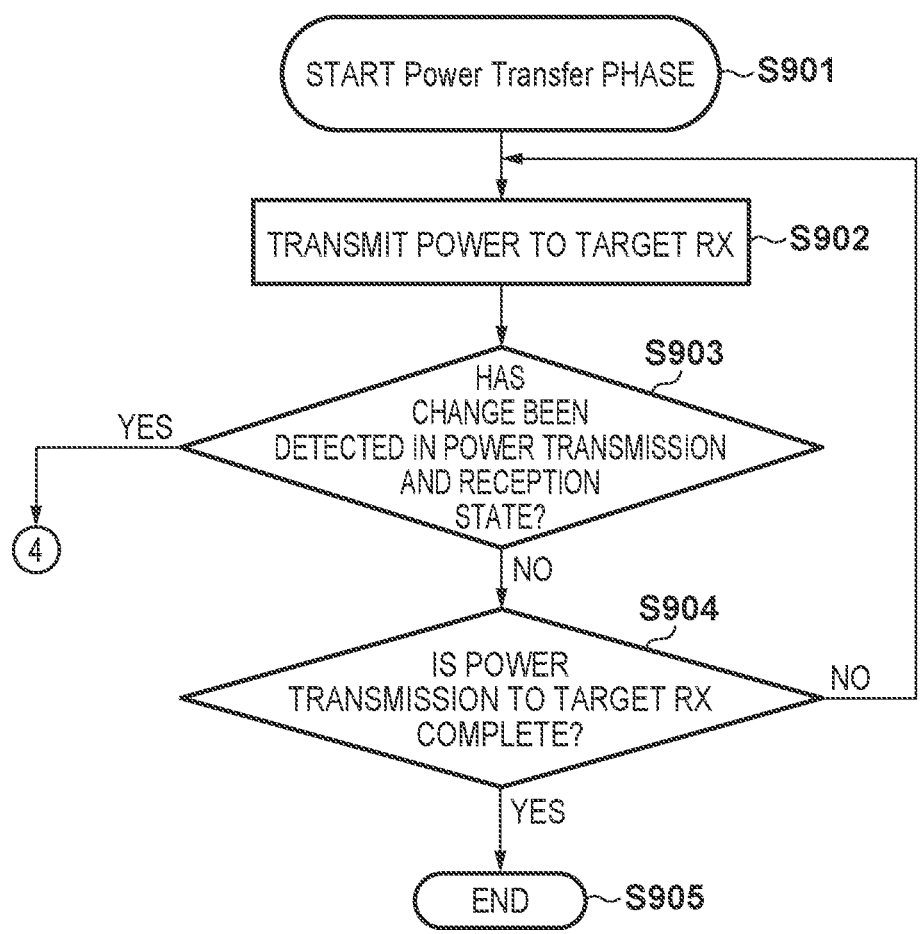
FIG. 9 is a flowchart of the processing of the Power Transfer phase according to the third embodiment.

In the Power Transfer phase (step S812), the TX 100 performs control so that power is transmitted using time-division to the plurality of RXs placed on the TX 100. The operations in the Power Transfer phase will be described in detail below using FIG. 9. FIG. 9 is a flowchart of the processing of the Power Transfer phase according to the present embodiment.

When the TX 100 starts the Power Transfer phase (step S901), the power transmission control unit 302 transmits power to the target RX (step S902). During power transmission, the foreign object detection unit 303 detects any change (change in the state on the TX 100) in the power transmission and reception state in the power-transmittal range of the TX 100 (step S706). For example, the foreign object detection unit 303 detects a foreign object via the power loss method described above using the Calibration data of the target RX acquired in the Calibration phase (step S810 of FIG. 8). When a foreign object is detected, the processing returns to step S802 of FIG. 8 (post-TX-start-up processing). However, the change in the power transmission and reception state may be due to an increase or decrease in the number of the RXs placed on the TX 100 and not due to a foreign object. Even in the case of an increase or decrease of the number of RXs on the TX 100, since there is a change in the power loss as described above, the foreign object detection unit 303 can detect an increase or decrease in the number of RXs on the TX 100 using the power loss.

When a change in the power transmission and reception state is detected in step S903, by returning to the post-TX-start-up during the flow of FIG. 8, even if there is an increase or decrease in the number of the RXs placed on the TX 100, power can be appropriately transmitted to all of the RXs.

When a change in the power reception state is not detected, the processing proceeds to step S904, and the control unit 101 determines whether or not power transmission to the target RX is complete. For example, if it is determined that the power transmission is complete due to the RX being at full charge or the like, the processing proceeds to step S905 and ends. When it is determined that power transmission is not complete, the processing proceeds to step S902, and the power transmission control unit 302 continues power transmission.

In this manner, in the present embodiment, first, the TX 100 sets a specific RX from among the plurality of RXs placed on the TX 100 as the target RX and then derives (acquires) the Calibration data of the target RX after performing control so that no charge or power is supplied to the non-target RXs from the TX 100 (FIG. 8). Then, the TX 100 acquires the Calibration data for all of the RXs. Thereafter, in the Power Transfer phase, the TX 100 sets a specific RX from among the plurality of RXs placed on the TX 100 as the target RX and uses the already derived Calibration data to transmit power to the target RX after performing control so that no charge or power is supplied to the non-target RXs from the TX 100 (FIG. 9). In this manner, by making the state of each RX when deriving the Calibration data and the state of each RX when power transmission is performed the same, the TX 100 can appropriately complete power transmission to all of the RXs.

Herein, a control method for appropriately transmitting power to a plurality of RXs has been described according to three embodiments. Note that in the embodiment described above, as a foreign object detection function, a method is used in which changes of the state on the power transmitting apparatus are detected via the power loss method. However, since the Q-factor changes when the number of RXs on the TX increase or decrease, a method of detecting an increase or decrease of the number of RXs on the TX via a Q-factor measurement method can be used. Accordingly, in the Q-factor measurement method performed in the Negotiation phase, when a change in the power transmission and reception state (for example, a change in the state on the TX) is detected by the TX, control may be performed to return to the post-TX-start-up operations. In other words, in the first embodiment, the processing may return to step S402 of FIG. 4A from step S506 of FIG. 5, in the second embodiment, the processing may return to step S602 of FIG. 6 from step S706 of FIG. 7, and in the third embodiment, the processing may return to step S802 of FIG. 8 from step S903 of FIG. 9.

Alternatively, instead of the Q-factor measurement method, control may be performed to return to the post-TX-start-up operations when a change in the power transmission and reception state of the TX is detected on the basis of measurement results of the resonant frequency of the power transmitting antenna, the steepness of the resonance curve, the inductor value of the power transmitting antenna, the coupling coefficient between the power transmitting antenna and an object placed on the TX, the electrical characteristic of a power transmitting unit including the power transmitting antenna of the TX, or the like or the measurement results from sensors mounted on the TX including a photoelectric sensor, a eddy current displacement sensor, a contact displacement sensor, an ultrasonic wave sensor, an image discrimination sensor, a weight sensor, and the like. Also, the TX may perform control so that an Analog Ping is periodically transmitted from the power transmitting antenna that is not the power transmitting antenna performing communication with and power transmission to the RX and the post-TX-start-up operations are returned to when a placed object is detected. In these cases, this is because there is a possibility of a new RX or foreign object existing near the power transmitting antenna.

In this manner, the TX measures the power loss in a state where there is no foreign object between the TX and the RX individually using time division for each one of the plurality of RXs existing in the power transmitting range of the TX and transmits power to each individual RX using time division. This allows the foreign object detection accuracy during power transmission processing to be improved.

Other Embodiments

In the first to third embodiments described above, the power transmitting apparatus has a configuration in which one power transmitting antenna selected from a plurality of power transmitting antennas is connected to one power transmitting unit. However, a configuration may be used in which a plurality of power transmitting units are connected to one power transmitting antenna. In other words, in a configuration in which the power transmitting apparatus includes a first power transmitting unit (power transmitting circuit) and a second power transmitting unit (power transmitting circuit) and a first power transmitting antenna and the second power transmitting antenna, either the first power transmitting unit or the second power transmitting unit can connect to the first power transmitting antenna. Let's consider a case in which the first power transmitting unit (power transmitting circuit) is connected to the first power transmitting antenna and power is transmitted to the power receiving apparatus, but the power transmitting unit (power transmitting circuit) connected to the first power transmitting antenna switches from the first power transmitting unit (power transmitting circuit) to the second power transmitting unit (power transmitting circuit). When the electrical characteristics of the first power transmitting unit and the second power transmitting unit are the same, there is no change to the Calibration data described above, and thus power can be transmitted to the power receiving apparatus from the second power transmitting unit (power transmitting circuit) via the methods described in the first to third embodiments using the Calibration data already acquired. However, when the first power transmitting unit and the second power transmitting unit has different electrical characteristics, the Calibration data described above also changes, and thus power cannot be transmitted using the Calibration data already acquired. Thus, with the methods described in the first to third embodiments, the Calibration data can be derived (acquired) again and used in the power transmission from the second power transmitting unit (power transmitting circuit) to the power receiving apparatus. Note that at this time, the power transmitting apparatus associates together the information of the power transmission target RX, the information of the power transmitting antenna used for power transmission, and the information of the power transmitting unit (power transmitting circuit) used for power transmission and stores them in the memory.

Power can be appropriately transmitted from a power transmitting apparatus to a plurality of power receiving apparatuses.

The present disclosure may be implemented by providing a program that implements one or more of the functions of the embodiments described above to a system or a device via a network or a storage medium and the program being read out and executed by one or more processors in a computer of the system or device. Also, the present disclosure may be implemented by a circuit (for example, ASIC) that implements one or more of the functions.

Embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmitting apparatus comprising:
   a plurality of coils; and
   a unit configured to:
      wirelessly transmit a message and a plurality of Pings;
      obtain identification information from one or more power receiving apparatuses;
      determine whether there are a plurality of power receiving apparatuses based on the obtained identification information;
      select coils corresponding respectively to the plurality of power receiving apparatuses in a case where there are the plurality of power receiving apparatuses;
      wirelessly perform power transfer to a first power receiving apparatus in the plurality of power receiving apparatuses via a first coil corresponding to the first power receiving apparatus and wirelessly perform power transfer to a second power receiving apparatus in the plurality of power receiving apparatuses via a second coil corresponding to the second power receiving apparatus, wherein the first coil and the second coil are included in the plurality of coils;
      transfer power to a first power receiving apparatus among the plurality of power receiving apparatuses, transmit, from all of the coils, a message for controlling non-target power receiving apparatuses so that they are not powered, then switch to the first coil corresponding to the first power receiving apparatus so that power transfer to the first power receiving apparatus becomes available, and wirelessly transfer power to the first power receiving apparatus via the first coil; and
      during power transfer to the first power receiving apparatus via the first coil, execute foreign object detection processing on the basis of reception power information received from the first power receiving apparatus.

2. The power transmitting apparatus according to claim 1, wherein the Ping is a signal to wake up the power receiving apparatus.

3. The power transmitting apparatus according to claim 1, wherein the Ping is a Digital Ping defined in a Wireless Power Consortium standard.

4. The power transmitting apparatus according to claim 1, wherein the Ping is a signal to detect an object.

5. A method for a power transmitting apparatus comprising a plurality of coils, the method comprising:
   wirelessly transmitting a message and a plurality of Pings;
   obtaining identification information from one or more power receiving apparatuses;
   determining whether there are a plurality of power receiving apparatuses based on the obtained identification information;
   selecting coils corresponding respectively to the plurality of power receiving apparatuses in a case where there are the plurality of power receiving apparatuses;
   wirelessly performing power transfer to a first power receiving apparatus in the plurality of power receiving apparatuses via a first coil corresponding to the first power receiving apparatus and wirelessly perform power transfer to a second power receiving apparatus in the plurality of power receiving apparatuses via a second coil corresponding to the second power receiving apparatus, wherein the first coil and the second coil are included in the plurality of coils;
   transferring power to a first power receiving apparatus among the plurality of power receiving apparatuses, transmit, from all of the coils, a message for controlling non-target power receiving apparatuses so that they are not powered, then switch to the first coil corresponding to the first power receiving apparatus so that power transfer to the first power receiving apparatus becomes available, and wirelessly transfer power to the first power receiving apparatus via the first coil; and
   during power transfer to the first power receiving apparatus via the first coil, execute foreign object detection processing on the basis of reception power information received from the first power receiving apparatus.

6. A non-transitory computer-readable storage medium storing a program for causing a computer to function as a power transmitting apparatus comprising:
   a plurality of coils; and
   a unit configured to:
      wirelessly transmit a message and a plurality of Pings;
      obtain identification information from one or more power receiving apparatuses;
      determine whether there are a plurality of power receiving apparatuses based on the obtained identification information;
      select coils corresponding respectively to the plurality of power receiving apparatuses in a case where there are the plurality of power receiving apparatuses;
      wirelessly perform power transfer to a first power receiving apparatus in the plurality of power receiving apparatuses via a first coil corresponding to the first power receiving apparatus and wirelessly perform power transfer to a second power receiving apparatus in the plurality of power receiving apparatuses via a second coil corresponding to the second power receiving apparatus, wherein the first coil and the second coil are included in the plurality of coils;

transfer power to a first power receiving apparatus among the plurality of power receiving apparatuses, transmit, from all of the coils, a message for controlling non-target power receiving apparatuses so that they are not powered, then switch to the first coil corresponding to the first power receiving apparatus so that power transfer to the first power receiving apparatus becomes available, and wirelessly transfer power to the first power receiving apparatus via the first coil; and during power transfer to the first power receiving apparatus via the first coil, execute foreign object detection processing on the basis of reception power information received from the first power receiving apparatus.

\* \* \* \* \*